United States Patent

Grandle, Jr.

[15] 3,694,587

[45] Sept. 26, 1972

[54] COIN STATION CONDUCTOR LEAKAGE TEST ARRANGEMENT

[72] Inventor: James Arthur Grandle, Jr., Marlboro, N.J.

[73] Assignee: Bell Telephone Laboratories, Incorporated, Murray Hill, N.J.

[22] Filed: May 26, 1971

[21] Appl. No.: 146,944

[52] U.S. Cl.............179/175.2 R, 179/175.3, 324/54

[51] Int. Cl...............................................H04m 3/22

[58] Field of Search.......179/175.3, 175.2 R, 175.11, 179/175.1 R, 175; 324/60 R, 60 CD, 54

[56] References Cited

UNITED STATES PATENTS 2,852,626 9/1958 Kessler................179/175.2 R 3,453,535 7/1969 Anglin.....................324/60 R

*Primary Examiner*—William c. Cooper

*Assistant Examiner*—Douglas W. Olms

*Attorney*—R. J. Guenther and James Warren Falk

[57] ABSTRACT

Test equipment connectable to a coin station for performing operational checks of the coil station apparatus is disclosed. The equipment is controlled by dialed signals and is capable of performing conductor leakage tests as well as line-to-line resistance checks on the audio communication path. Excessive leakage values and low line resistance insulation values are indicated by tone signals.

11 Claims, 16 Drawing Figures

INVENTOR
J. A. GRANDLE, JR.
BY Henry J. Walsh
ATTORNEY

CHART A

| BATTERY ON | BPR OPERATES ON |
|---|---|
| BP1 | 1 |
| BP2 | 1,2 |
| BP3 | 1,2,3 |
| BP4 | 1,2,3,4 |

COIN STATION CONDUCTOR LEAKAGE TEST ARRANGEMENT

This invention concerns coin station test equipment and in particular, centralized facilities connectable to a coin station via a dialed connection for testing the station apparatus as well as the transmission path connected thereto.

Various station circuit testing arrangements have been devised which, for example, automatically ring a station set when the receiver is replaced on its cradle and for verifying the pulse rate of a station set dial. More sophisticated test arrangements have also been designed which run simple tests on coin station apparatus. These latter arrangements have included tests for checking the presence of a coin and for verifying the operation of "coin collect" and "coin return" station apparatus. However, much of the coin station equipment is not tested by centralized test arrangements. Thus, it is customary for a craftsman to bring portable test equipment as well as power sources to a coin station site in order to run many routine tests of the coin station apparatus.

Coin stations include a plurality of relay control circuitry which operates in response to signals transmitted over the two-wire transmission path connecting the coin station with central switching equipment. These relays function during a call for counting coins, removing transmission path shunts, and to perform a host of other functions unique to coin station operation. The proper operation of the circuits is dependent upon the maintenance of a high quality transmission path. Such a path must have a maximum value of leakage-to-ground resistance and a maximum interlead isolation. Moreover, the transmission quality of voice is dependent upon these same factors.

A principal cause for the development of leaky cables and a lowering of interlead resistance is due in large part to deterioration of the main cable sheathing due to aging and weather conditions. This process has been observed to take a relatively long period of time—in some instances years. However, deterioration can be measured by sensitive instruments and therefore failures of coin station apparatus due to this condition can be considerably reduced and perhaps eliminated. A factor which has prevented the realization of early detection of cable faults is the necessity of furnishing portable test devices at the coin station site.

Accordingly, a need exists for an improved centralized test facility which substantially eliminates the necessity for portable rest equipment to make routine checks of the coin station and the cables associated therewith. More particularly, an urgent need exists for centralized transmission cable testing facilities capable of making early detection of cable faults thereby reducing the incidence of call failures and the resultant loss of revenue.

SUMMARY OF THE INVENTION

The foregoing objects are achieved in accordance with my illustrative embodiment of the invention which includes a coin station test facility located centrally in a switching office, connectable to a coin station by dialing a special test line code, and responsive to dialed signals for making specified tests of the station apparatus. Importantly, the facility provides the craftsman with a direct indication of the test results after each test thereby eliminating the need for portable test equipment at a coin station for many routine tests.

Advantageously, a craftsman may dial-select a test sequence in which the resistance between conductors of the transmission line as well as the leakage value of the transmission loop is automatically tested. The facility is responsive to a particular dialed digit to precharge the line, and to connect a unique neon detection network to the line. If the leakage value of the loop is below a predetermined value, the detector operates and controls the transmission of a coded signal to the station. Resistance measurements are made with a voltage detector and constant current source which are concurrently connected to the transmission conductors to sense the resistance of the transmission path. If this resistance falls above a maximum value, tone signals are transmitted to the station set.

During the resistance-leakage test, the craftsman is required to replace the receiver on-hook so as to simulate an open circuit at the station. Advantageously, the facility includes circuitry for indicating the beginning of this operational stage to the craftsman and for converting answer signals from the customary tone signals to ringing signals while the receiver is on-hook.

Dialing the digit 2 selects the resistance-leakage test. Before the actual test is made, however, the facility runs preliminary tests over the station line, to determine if a coin is present in the coin station apparatus. If no coin is present a special tone, a C tone, will be heard to indicate this condition. If a coin is not deposited within sixty seconds a disconnect will be initiated. If, on the other hand, a coin is detected the loop-to-ground resistance will be measured. Following this test a signal will be forwarded to the coin station apparatus to control the return of the coin. If the coin is returned the automatic test apparatus will perform a second resistance check, this time of the loop resistance. Following the last test the results of both test will be given by coded tones which are repeated three times. Three beep tones indicates that the loop and ground resistance are within limits while two beep tones or one beep tone respectively indicates a high loop resistance or high ground resistance. Following the indication of the test results a steady high tone will be forwarded to the coin station to request that the craftsman place the receiver in the on-hook condition. When the receiver is detected as being on on-hook, a leakage measurement is made of the loop. The leakage test is designed to determine leakage values less than 100K ohms. Advantageously this test would permit early detection of leaking loops, therefore averting possible circuit failures. Results of this test are given by ringing the coin telephone station as follows. A single ring indicates a good loop test, while two consecutive short rings indicates a loop-leakage or grounded condition. Advantageously, if the craftsman removes the receiver before the ringing indication can be transmitted to the coin station a coded tone is transmitted instead. At the end of this test sequence interrupted dial tone is sent to the coin station.

After completion of the conductor leakage and line-to-line resistance tests, as discussed above, the craftsman can then select various other particular test sequences for operational testing of the coin station equipment, as described further below and as further set forth in my application Ser. No. 146,916, filed on even date herewith (Case 1).

A feature of my invention is the provision of a station controlled test circuit which may be centrally located, i.e., a central office, and controlled by dialed digit to perform conductor leakage as well as line-to-line resistance tests of the station line conductors.

Another feature of my invention is the provision of apparatus within the test circuit for sending the test result indications to the station.

Yet another feature of my invention is the provision of a neon tube detector which cooperates with precharge circuit for charging a line under test to a predetermined voltage and for monitoring with the neon tube detector the discharge rate of the line to ascertain the leakage condition of the line conductors.

DESCRIPTION OF THE DRAWING

The various features and objects of this invention will become apparent from the description of the preferred embodiment with reference to the accompanying drawing in which.

DETAILED DESCRIPTION

Figures 1, 14:
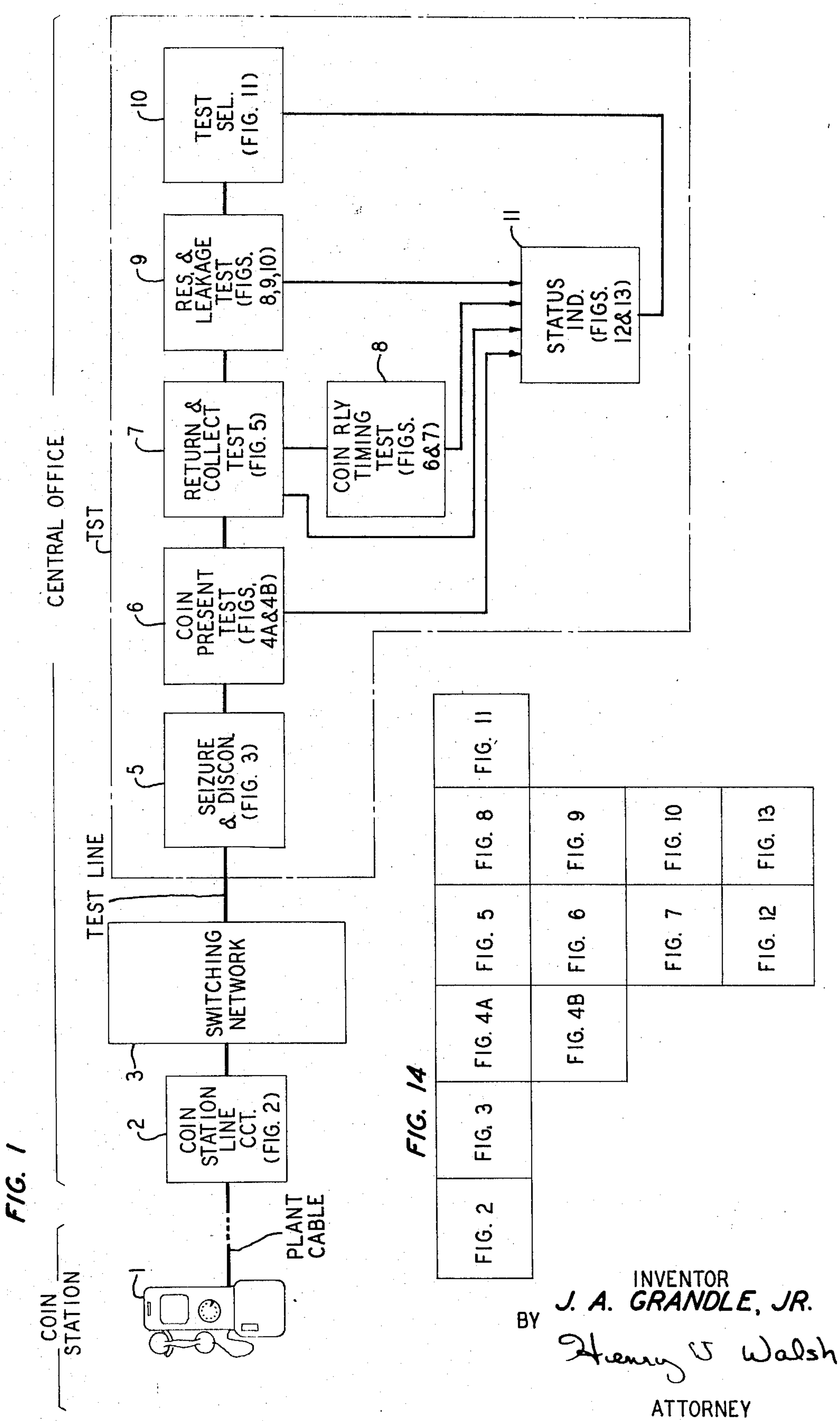
FIG. 1 shows an overall block diagram scheme of a coin station, circuitry of a switching office and the test facility.
FIG. 14 indicates the method of organizing of FIGS. 2 through 13 to depict this specific embodiment of my invention.
Figures 2, 2A:
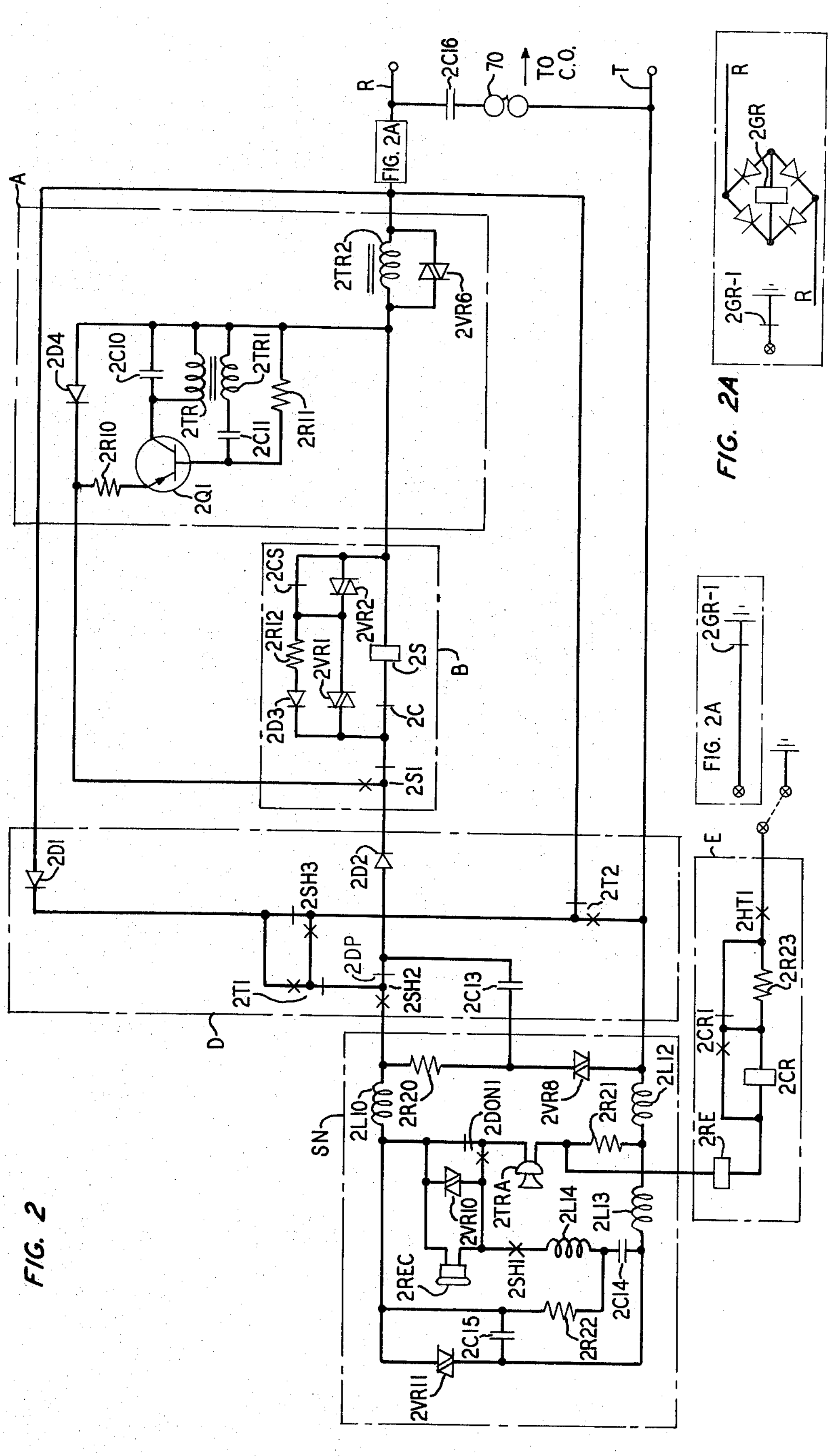
FIG. 2 discloses details of the coin station circuitry.
FIG. 2A discloses a modification of FIG. 2 adapting it for dial-tone-first single slot operation.

The invention will now be presented in general terms with reference to FIG. 1 which shows in block diagram form the essential elements of and relating to my invention. Coin station 1, which is disclosed in greater detail in FIG. 2, is connected via a conventional outside plant cable shown as a dashed line in FIG. 1, to a central office. The cable terminates in coin station line circuit 2 which is disclosed in greater detail in FIG. 3. Switch network 3 symbolizes customary switches, registers, links, junctors, and common control circuitry (not shown in greater detail) which respond to dial address signals for establishing call connections between circuit 2 and other lines or trunks (not shown). Importantly, the present invention is concerned with a "test line" indicated in FIG. 1 and automatic test facility TST associated therewith. The test line switching network appearance is assigned to a special test line code in order that a craftsman situated at coin station 1 may dial-select a connection between coin station line circuit 2 and the test line via network 3.

The subcircuits which make up test facility TST are identified in FIG. 1 and enclosed by a dashed line rectangle. The test line connects to a seizure and disconnect circuit 5 shown in detail in FIG. 3. The circuit contains call supervisory detection apparatus as well as the overall circuit timing apparatus which controls the disconnect of coin station-to-test line call connections automatically after sixty seconds if a normal disconnect is not achieved.

The conductors of the test line connect serially to coin present test circuit 6, return and collect test circuit 7, resistance and leakage test circuit 9 and to test selection circuit 10. The test line connection to each of these circuits is represented by an object (heavy weighted) line in FIG. 1. Coin relay timing test circuit 8 connects directly to the return and collect test circuit 7 from which it receives control voltages.

Status indicator circuit 11 connects to each of the individual test circuits described above to transmit an indication to the coin station of test results. The connection to each of the individual test subcircuits is indicated by lines having arrowheads pointing towards status circuit indicator 11. The signals generated by status indicator 11 are coupled to test selection circuit 10 which in turn forwards the signals via the test line to the coin station.

COIN STATION APPARATUS

EQUIPMENT DESCRIPTION

A brief explanation will now be given of the detail circuitry of the coin station as disclosed in FIG. 2 to serve as a base for understanding the operation of the test facility. The station circuitry depicted is classed as a coin-first (single slot) coin phone. A coin station may be classified broadly in terms of sub-circuits which include an oscillator circuit A, a coin identification signal speed control circuit B, a telephone speech network SN, an operating control circuit D and signal circuit E comprising a coin relay 2CR, and reset relay 2RE. Oscillator circuit A, which generates tone pulse coin identification signals, employs a transistor 2Q1 with conventional collector-to-base coupling provided by transformer coils 2TR and 2TR1. Oscillator A also includes frequency determining capacitors 2C10 and 2C11 and biasing resistors 2R10 and 2R11. Diode 2D4 bridged between the ring lead and one terminal of emitter-biasing resistor 2R10 establishes a fixed reference voltage for oscillator A and also provides a holding path for central office supervisory circuits. The oscillator output is applied to the ring lead by additional transformer winding 2TR2 shunted by a click suppressor varistor 2VR6.

The coin identification signal speed control circuit B includes the coil 2S of a stepping motor, not shown, which is in series with the ring lead. The rate at which the stepping motor operates is determined by the reference voltage across coil 2S which is in turn established by the magnitude of the shunting impedance. For low speed action employed to signal the deposit of a nickel or a dime, the impedance shunting coil 2S results from the series combination of resistor 2R12 and diode 2D3 in parallel with varistor 2VR1. With the deposit of a quarter, however, break contact 2CS operates, opening the shunt path around varistor 2VR2. The higher impedance across coil 2S, resulting from the addition of varistor 2VR2 to the combination of varistor 2VR1, resistor 2R12 and diode 2D3, raises the voltage across coil 2S which increases the stepping and signaling rate. Break and make contacts 2S1, operated by the armature of the stepping motor, interrupt the flow of current to the steeping motor and to oscillator A, respectively, thus providing for the stepping action of the motor and the pulsing action of the oscillator.

Telephone speech network SN is coupled to the ring lead through switchhook make contact 2SH2 and inductor 2L10, and to the tip lead through inductor 2L12. Speech network SN is wholly conventional and is included herein merely to ensure completeness of disclosure. The upper terminal of transmitter 2TRA is extended directly to the ring lead and the lower terminal is extended to the tip lead through resistor 2R21. Receiver REC is similarly bridged between the ring lead and tip lead through switchhook contact 2SH1, inductors 2L14, 2L13 and 2L12, and capacitor 2C14. Other elements in speech network SN include dial off-normal contact 2DON1, resistor 2R22, capacitor 2C15, and varistors 2VR10 and 2VR11.

Control and logic circuit D includes diodes 2D1 and 2D2 which provide the logic necessary to detect current reversals in the ring lead when dial tone is applied to the line. Diode 2D1 provides a shunting path around oscillator A and speed control circuit B for positive current on the ring lead. Negative current on the ring lead is permitted to flow through stepping motor 2S by diode 2D2. Break contact 2T2 opens a shorting path around stepping motor 2S, thus readying stepping motor 2S for operation. Make contact 2T2 completes a path between the ring lead and tip lead which shorts out telephone speech network SN.

Coin relay 2CR and reset relay 2RE of signal circuit E provides a path to ground from the tip lead whenever hopper trigger contact 2HT1 is operated. This path may be traced from ground through hopper trigger contact 2HT1, resistor 2R23, coin relay 2CR, reset relay 2RE, and resistor 2R21. Ground is of course also extended through this path to speech network SN and additionally may be applied to the ring lead through make contact 2T2 of control and logic circuit D. Contacts 2CR1 are provided to by-pass coin relay 2CR when it operates and to insert resistor 2R23 into the coin ground path to limit the coin relay operating current.

FIG. 2A discloses a ground removal relay 2GR which is inserted into the ring lead between subcircuit A and the ring conductor connection to the central office as shown in FIG. 2. A contact of this relay, 2GR–1, (wire to the terminal of subcircuit E in place of a direct ground) removes coin ground from subcircuit E when talking battery is applied to leads tip and ring. The apparatus of FIG. 2A is furnished on dial-tone-first (single slot) arrangements.

A conventional ringer circuit including ringer 70 in series with capacitor 2C16 is bridged across the line between the ring lead and tip lead as shown at the right-hand side of FIG. 2.

Coin Station Equipment Operation (FIG. 2A Not Provided)

While the coin telephone is idle, the central office monitors the station by connecting battery to the ring lead with tip lead left open. When the customer removes the handset (not shown) switchhook contacts 2SH1 of circuit SN operate to complete a path, placing receiver 2REC across the line. Switchhook contacts 2SH2 operate to complete a path between the ring lead and speech network SN. Break contact 2SH3 opens a shorting path across rate contacts 2T1.

With the deposit of any coin, the shaft and cam of the totalizer (not shown) rotate off-normal, operating contacts 2T2. The break contact of contacts 2T2 opens a shorting path around stepping relay 2S. The make contact of contacts 2T2 completes a shorting path across telephone speech network SN.

If the deposit of the first coin does not equal the preselected initial rate, contacts 2T1 do not transfer and accordingly stepping motor 2S does not operate and dial pulse contacts 2DP remain shorted. The coin falling into the hopper (not shown) trips hopper trigger contact 2HT1 which provides continuity between speech network SN and ground over the path previously described. When the initial rate has been deposited, rate contacts 2T1 are operated and latched in the operated conditions. The operation of break contact 2T1 closes a path from the ring lead to ground through diode 2D1, make contact 2T1, make contact 2SH3, make contact 2T2, inductor 2L12, resistor R21, and thence to ground through the elements of sub-circuit E.

The current flow described is recognized by the central office as a start and at this point the central office conventionally applies negative battery to the ring lead and grounds the tip lead, causing loop current to flow in the direction to operate stepping motor 2S which resets the totalizer to the normal position. When the totalizer is back in the normal position, speech network SN of the telephone set is unshorted by the release of make contact 2T2 and the customer hears dial tone. Contacts 2T1 having been latched in the operated position do not interfere with dialing at this time. When the call is terminated, the central office conventionally applies a coin pulse to the tip lead. The consequent current flow to ground through the coin relay 2CR and reset relay 2RE operates reset relay 2RE which serves to unlatch contacts 2T1. Additionally, coin relay 2CR is operated to collect or refund coins held in the coin hopper.

With this as a background, our attention next turns to test facility as disclosed in FIGS. 3–13.

Coin Station Equipment Operation (FIG. 2A Provided)

In these arrangements talking battery is applied at all times to leads tip and ring, and therefore when the receiver is taken off-hook, there is no necessity for a coin deposit to detect this condition. Accordingly, a register is immediately connected to the coin station and dial tone is transmitted.

Checks for coins present are made by opening the ring lead and applying a battery to the tip lead. This releases relay 2GR and current flows from the tip lead to ground via subcircuit E if a coin is present.

Connection to Test Facility TST

After removing the receiver away from the switchhook at coin station 1 and a coin has been deposited (except in dial tone-first coin station arrangements), earth ground is connected by the coin station apparatus as hereinbefore described to the ring lead R. As a result relay 3L is operated and a signal is sent to switching network 3 (apparatus not shown) requesting a connection to a dial tone register. In a customary manner dial tone is returned to coin station 1 via conductors 30 and 31, operated contacts 3CT–2 and 3CT–1, and the tip lead T and ring lead R. It is to be noted that relays 3SL and 3CT, the latter operated via operated contact 3SL–1, are operated as soon as a dial tone register connection is established. The coin station speech network, SN, shunted to prevent communication prior to registering a coin, is enabled as soon as loop current operates stepping motor 2S as described hereinbefore.

The craftsman dials the special test code to signal network 3 that a connection to the test facility is required.

Assuming that the test facility and the coin station terminate in the same office, a connection is established between conductors 30 and 31 of line circuit 2 and the test line of the test facility via network 3. The closed loop of the coin station furnishes an operate path for relay 3SUPV. It is to be noted in certain types of central offices, conductors 30 and 31 are shorted momentarily by common control circuits before a connection is cut-through to coin station 1 so that a switch train holding path can be prepared in sufficient time before the common office circuits release. The operate path of relay 3SUPV includes contacts 3OH–1 and 30H–9 which are operated immediately after relay 3SUPV operates so as to disconnect relay 3SUPV from the loop before the first test is performed on the coin station apparatus. Specifically, at contact 3SUPV-8 an obvious path to ground is closed when relay 3SUPV operates for operating relay 30H (off-hook) via non-operated contact 3DISC–1. A holding circuit for relay 30H is furnished by contact 30H-11. A switch train or hold magnet holding circuit is provided by contact 30H-4 which connects ground to conductor 35. Conductor 35 may be traced via a path in network 3 (not shown) to relay 3SL which is also held operated by relay 30H. The release of relay 30H is exclusively under control of relay 3DISC (Disconnect) which is, in turn, operated by the overall circuit timer 200. In the present example, the timer is set for 60 seconds. However, as the subsequent discussion will reveal, contact 4BON-1, which activates timer 200, is periodically opened to recycle timer 200 as various tests are performed and therefore the overall timing period may greatly exceed 60 seconds.

Figure 4A:
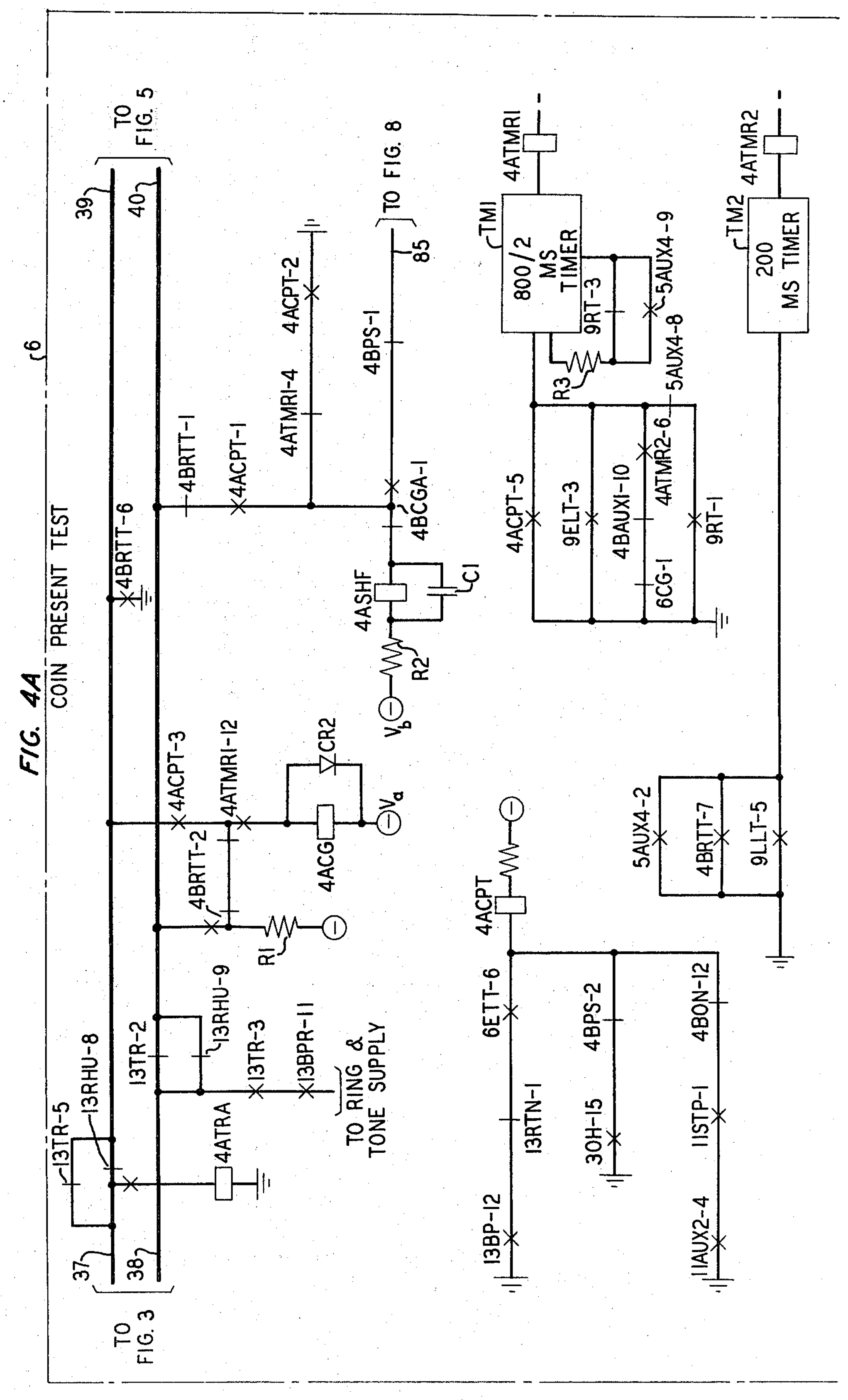
FIGS. 4A and 4B describe the coin-present test circuit.
Figure 4B:
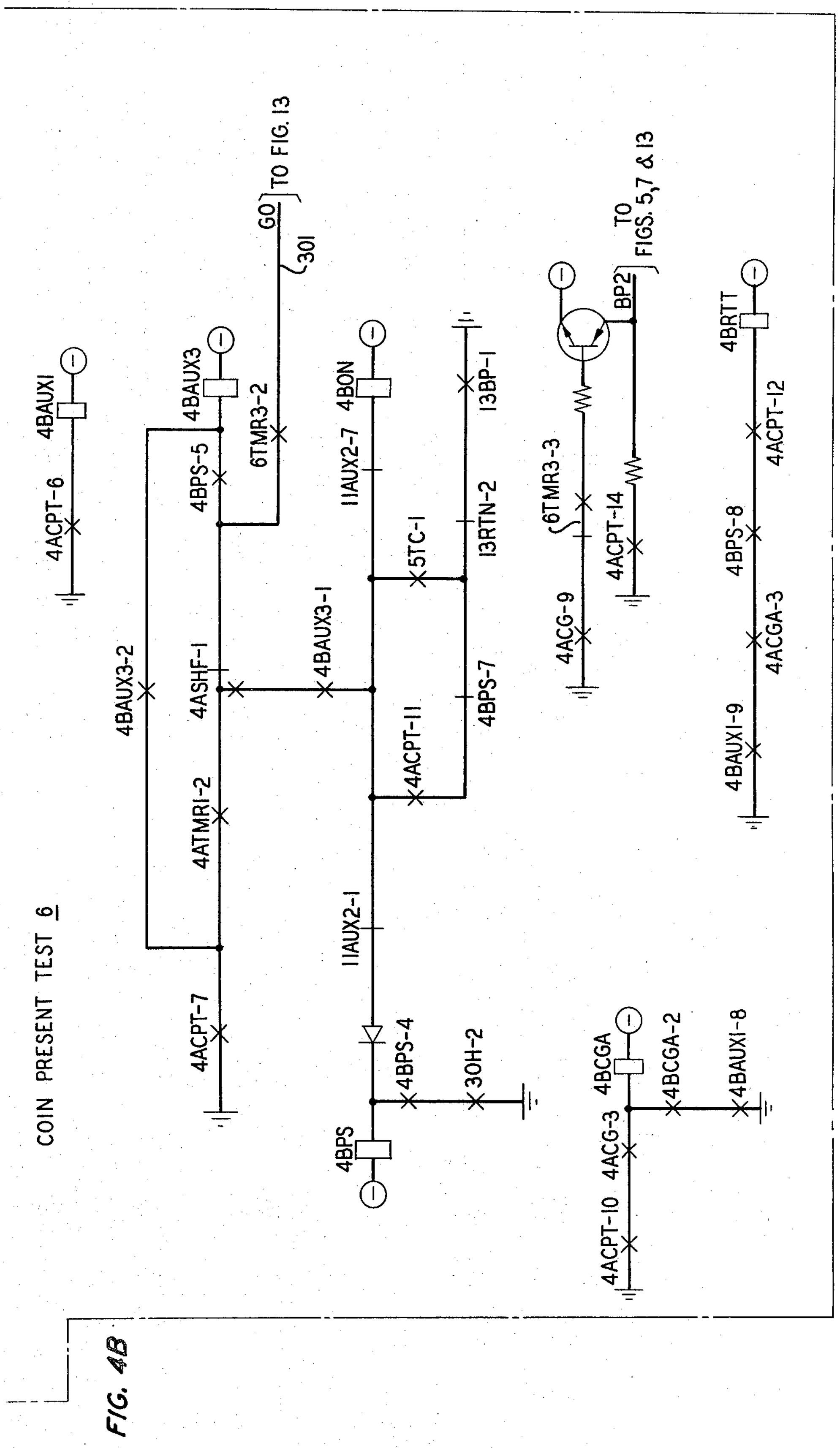

Coin Present Test (FIGS. 4A and 4B)

This test is implemented automatically (a) following an initial connection to the test facility, and (b) as part of the dial selected tests "return and collect test," "resistance and leakage test," and "coin relay timing test". It serves to determine whether or not a coin is present in the coin station apparatus, and, if not, to request that a coin be deposited. A coin deposit is required before each test is dialed in a non-dial tone first arrangement since the station dial is ordinarily shunted (or should be) until the initial coin rate requirement is satisfied. Following the initial coin present test, a ground isolation test is also performed by the test apparatus to check the operation of the ground removal relay (FIG. 2A) contacts 2GR–1 in coin station 1 in dial tone first arrangements.

The test circuitry for the coin present check and ground isolation test is shown in FIG. 4A. The operate, or release condition of relay 4BPS (pretest start) shown in FIG. 4B controls respectively whether a coin present check only or a combined coin present and ground isolation test is run. Both tests are set in motion by the operation of a single relay, relay 4ACPT (Coin Present Test).

Combined Coin Present & Ground Isolation Test (Relay 4BPS Released)

Operated contact 4ACPT–5 starts timer TM1 which measures an 800 millisecond (MS) interval after which relay 4ATMR1 operates. During this timed interval a negative battery potential is connected by contact 4ACPT–3 to the tip lead, conductor 37. In earlier type coin stations this signal drops a deposited coin. However, this signal does not effect an operation in the type of coin station shown in FIG. 2.

The battery potential applied to conductor 37 also serves to signal the office equipment (not shown), by a reversal of the conductor voltages on the loop, that the test facility connection has been made. This reversal is required in certain types of switching offices to release the common control equipment.

When relay 4ATMR1 operates indicating the end of the timed interval, its operated contacts connect relay 4ASHF (Switch Hook Flash) to the ring lead, conductor 40, and relay 4ACG (Coin Ground) to the tip lead, conductor 39. It is to be noted that relay 4ASHF is preoperated by contacts on relay 4ACPT and a local circuit to ground prior to the loop connection. This operate path may be traced starting at the winding of relay 4ASHF via contacts 4BCGA–1, 4ATMR1–4 and 4ACPT–2 to ground. If a coin is present in station 1 and there is loop continuity, relay 4ASHF remains operated and relay 4ACG operates when the winding of those relays are connected to the loop. The station coin ground provides a holding path for relay 4ASHF as well as an operate path for relay 4ACG. If no coin is present, relay 4ACG does not operate. Relay 4ASHF releases only if there is no loop continuity and it will remain operated over the loop even though no coin ground is present via diode CR2 which shunts relay 4ACG. The potential $V_a$ is of lower value than potential $V_b$ and therefore loop current sufficient to hold relay 4ASHF flows through the coin station loop and diode CR2.

Capacitor C1 which is bridged across the winding of relay 4ASHF is fully charged when relay 4ASHF is operated. At the end of the coin present test when the hold path for relay 4ASHF is opened, capacitor C1 increases the release time of that relay to prevent false operations from line voltage surges (hits) on the line conductors and to permit the relays of the test line to become stabilized.

The test facility sends a C tone to the coin station if no coin is present. This condition, it will be recalled, exists if relay 4ACG is not operated at the end of the timed interval (relay 4TMR1 operated). With reference to FIG. 13 a path for operating relay 13CT which controls the application of this signal may be traced beginning at its winding, via contacts 4ATMR1-2, 4ACG-1 and 4ACPT-9. Turning next to the top center of FIG. 11, contact 13CT-3 couples the tone signals on leads 90 and 91 via contacts 12INTR-2 which are continuously operating and releasing to the test line. The signals are coupled via capacitor C2, conductor 41 and transformer TN to the tip lead, conductor 39 and the ring lead, conductor 40. These conductors may be traced via FIGS. 8, 5, 4A and 3 to coin station 1. For details of the control circuit which operates relay 12INTR to produce the interruptions in the tone, reference should be made to FIG. 12 and to the discussion under the heading "Status Indication".

In response to the C tone, the craftsman deposits a coin in the station apparatus and manually causes the coin to drop in an attempt to generate the coin ground. If this manual attempt is successful, the coin ground operates relay 4ACG which is monitoring the tip lead, conductor 390 to release relay 13CT and to cut off C tone.

When relay 4ACG operates the test circuit automatically advances to a ground isolation test which checks the operation of the coin ground removal relay of station 1. Relay 4BCGA shown in FIG. 4B operates from relay 4ACG and lock up over an obvious path. In operating, contact 4BCGA-1 disconnects relay 4ASHF from the ring lead, conductor 40, and connects constant current source 201 shown in FIG. 8 in place of relay 4ASHF. The connecting path may be traced beginning in FIG. 8 via lead 85 which extends to FIG. 4A, and therein via contacts 4BPS-1, 4BCGA-1, 4ACPT-1 and 4BRTT-1 to the ring lead. Source 201 furnishes 20 milliamperes of current which is sufficient to operate the coin ground removal relay, 2GR of FIG. 2A. If the latter relay operates, relay 4ACG releases as soon as the coin ground is removed. Relay 4BCGA remains operated, however, via contacts 4BCGA-2 and 4BAUX1-8. Relay 4BAUX1 operated at the beginning of the coin present test to record the test initiation upon the closing of relay contact 4ACPT-6.

Figure 6:
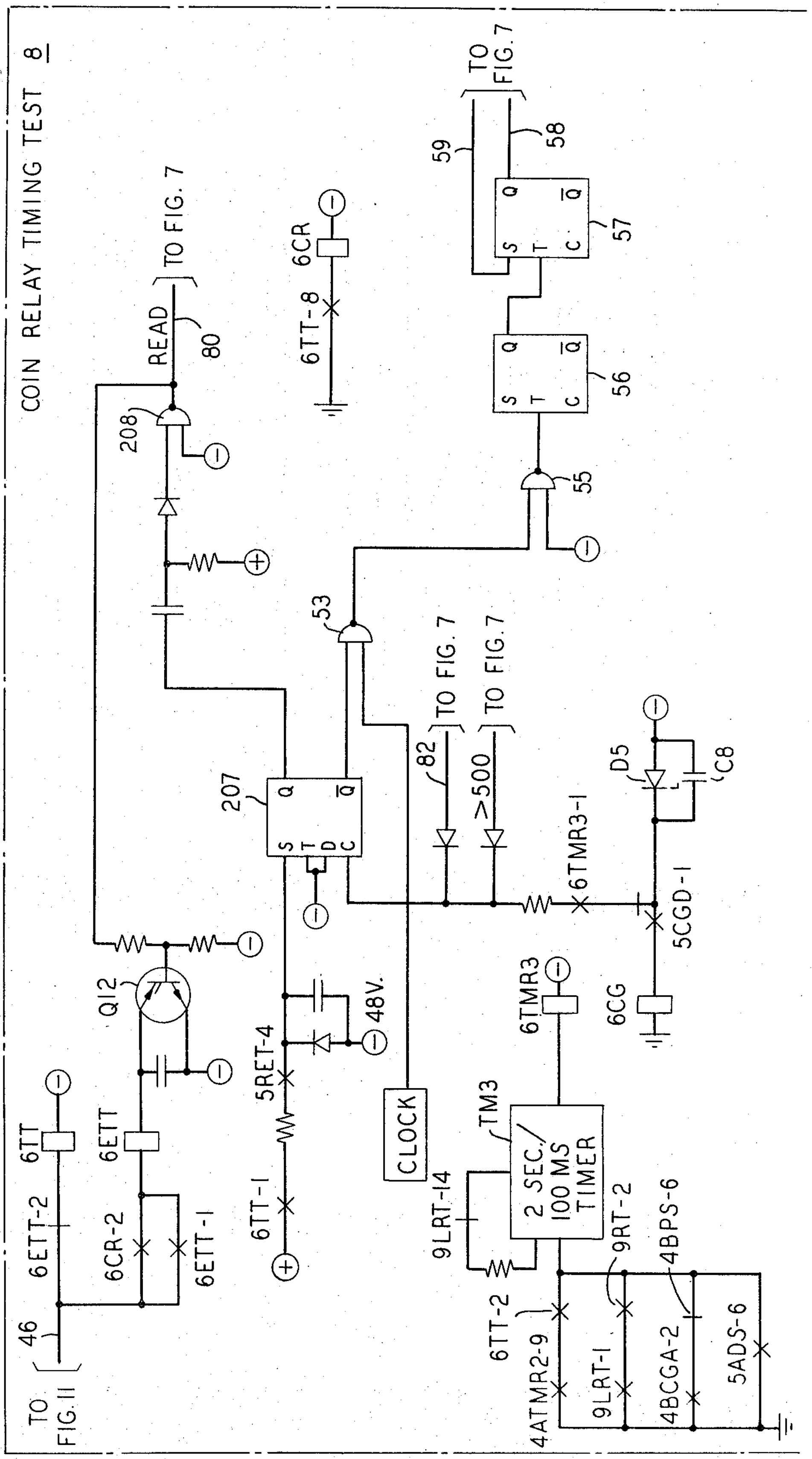
FIGS. 6 and 7 disclose the coin relay timing test circuitry.

At the same time that current source 201 is connected to the ring lead, a circuit is activated to time the ground isolation test. This circuit is shown in FIG. 6 and it includes timer TM3 and relay 6TMR-3. Timer TM3 is activated by ground which is connected thereto via contacts 4BCGA-2 and 4BPS-6. When relay 6TMR3 operates, relay 13RTN and 13BP (FIG. 13) are operated to control a tone indication which is sent to station 1 to report the test results. The operating path for those relays is shown in FIG. 4B and it may be traced from ground via contacts 4ACPF7, 4ATMR1-2, 4ASHF1, and 4TMR3-2 and lead 301 which extends to FIG. 13 and the relay windings. Relay 6TMR3 at its contact 6TMR3-3 shown in the lower right-hand side of FIG. 4B switches a latching transistor 4BQ31 if coin ground was detected (relay 4ACG operated). After the signal is transmitted a path is closed to operate relay 4BON which in turn operates relay 4BPS. The latter relays prepare the test facility for dial selected tests. Considering the operating paths in greater detail, the path for operating relay 13RTN may be traced from its winding via contact 11INTR-3, lead 301, which connects to FIG. 4B, contacts 6TMR3-2, 4ASHF-2 and 4ACPT-1 to ground. Referring back to FIG. 13 a path for operating relay 13BP may be traced from its winding via contact 13RTN-8 which connects to the path just described for operating relay 13RTN. Referring next to FIG. 4B, relay 4BON operates over a path which includes contacts 4ACPT-11, 4BPS-7, 13RTN-2 and 13BP-1 which connects to ground. The path for operating relay 4BPS may be traced from its winding via contact 11AUX2-1 where it connects to ground via the path last-described.

The test results are indicated as follows:

A. one beep tone — coin ground detected and coin ground removal relay operates normally, and B. two beep tones — coin ground removal rélay has malfunctioned, or is not present.

Details of the method of operation of the circuitry in FIGS. 12 and 13 for sending the beep tones is described hereinafter under the section headed "Status Indication". With reference to FIG. 13, a single beep tone is sent if lead BP1 is connected to battery and two beep tones if lead BP2 is connected to battery.

Coin Present Test (Relay 4BPS Operated)

Since relay 4BPS is operated, the ground isolation test is omitted. Thus when relay 4ACPT operates only the coin present test is activated substantially as described above. Negative battery is connected to the tip lead, conductor 37 via contacts 4ACPT-3, 4ATMR1-2 (not yet timed out), 13RHU-9 and resistor R1. Ground is connected to the ring lead, conductor 40, via contacts 4BRTT-1, 4ACPT-1, 4ATMR1-4 and 4ACPT-2. These potentials serve to drop a deposited coin as stated above. After an interval, timed by the circuit which includes operated relay 4TMR1, the battery on the tip lead is replaced by the coin ground sensing relay 4ACG. If relay 4ACG operates the coin ground is present and the test facility is automatically advanced to the dial selected test mode. If relay 4ACG remains released, C tone is returned to station 1 as previously discussed. Relay 4BRTT shown in FIG. 4B which operates if relay 4ACG operates (via contacts of slave relay 4BCGA) provides battery and ground on the tip and ring leads to reset the totalizer (if it failed to reset previously). Specifically, note that operated contact 4BRTT-1 isolates relay 4ASHF from the ring lead and contacts 4BRTT-2 isolate the tip lead from battery. Contact 4BRTT-2 also connects battery to the ring lead and contact 4BRTT-6 connects ground to the tip lead.

If the craftsman hears the C tone he has two options to follow. As described above he can deposit coins or manually control the hopper trigger 2HT1 until coin ground is present. This will advance the test facility to the beginning of the dial selected test. If this procedure fails then flashing the coin station switchhook advances the facility to the test select mode. Relay 4ASHF is connected to the tip conductor when relay 4TMR1 operates if relay 4ACG and its slave, relay 4BCGA has not operated. Therefore, a flash of the switchhook momentarily opening the loop, releases relay 4ASHF which, in turn, operates relay 4BAUX3. When loop continuity is restored relay 4ASHF reoperates and closes a path for operating relay 4BON which advances the facility to the test select mode. This path may be traced from the winding of relay 4BON via contacts 11AUX2–7 4BAUX–3, 4ASHF–1, 4ATMR1–2 and 4ACPT–7 to ground.

Dial Selected Tests

The craftsman is notified that he may proceed to dial select a test when interrupted dial tone is heard on the test line. The application of this tone signal to the test line is controlled by relay 4BON and more specifically by operated contact 4BON–7 shown at top center of FIG. 11.

Figure 5:
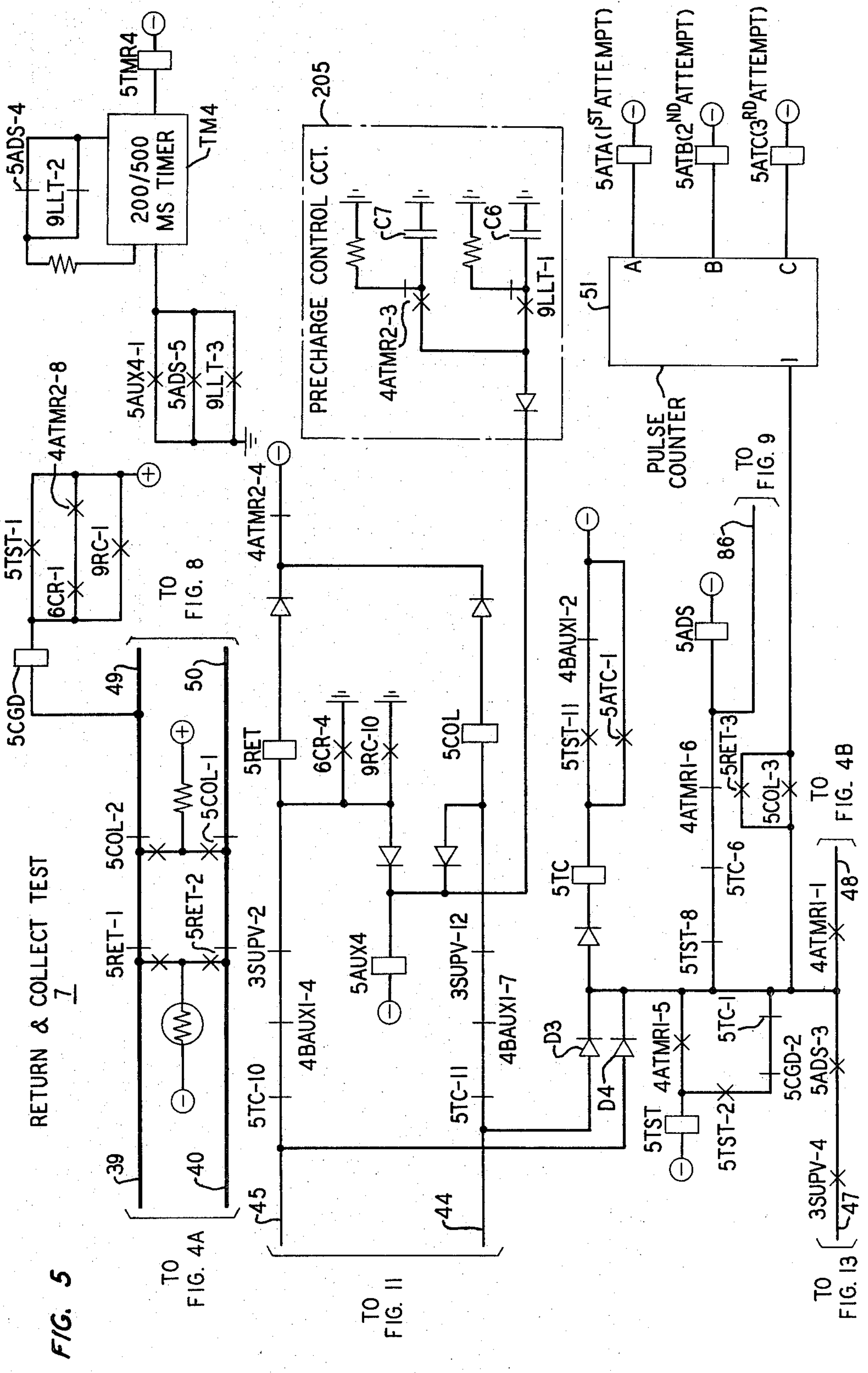
FIG. 5 depicts the return and collect test circuit.
Figure 8:
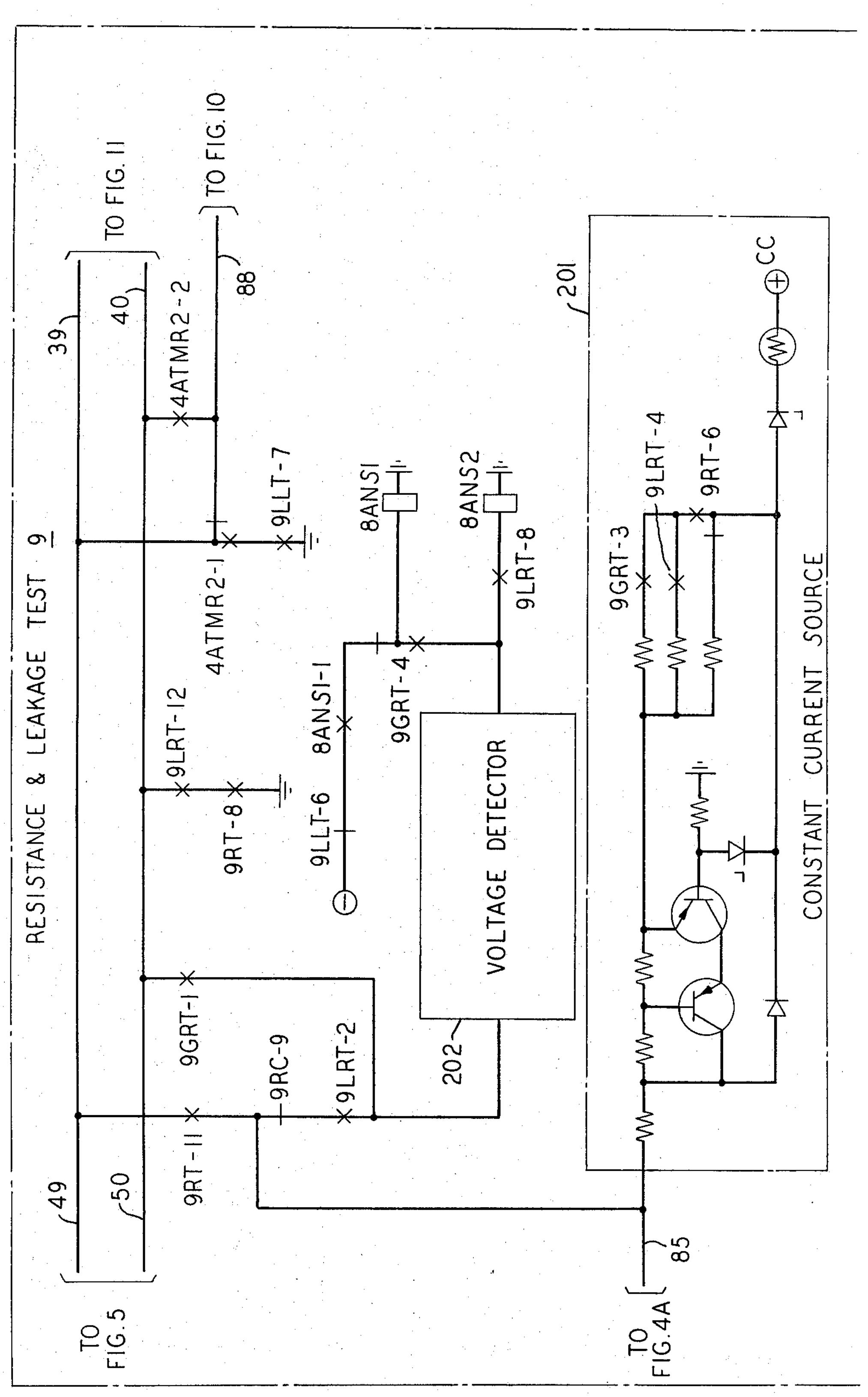
FIG. 8 shows the voltage detector and current source of the resistance and leakage test circuitry.
Figure 11:
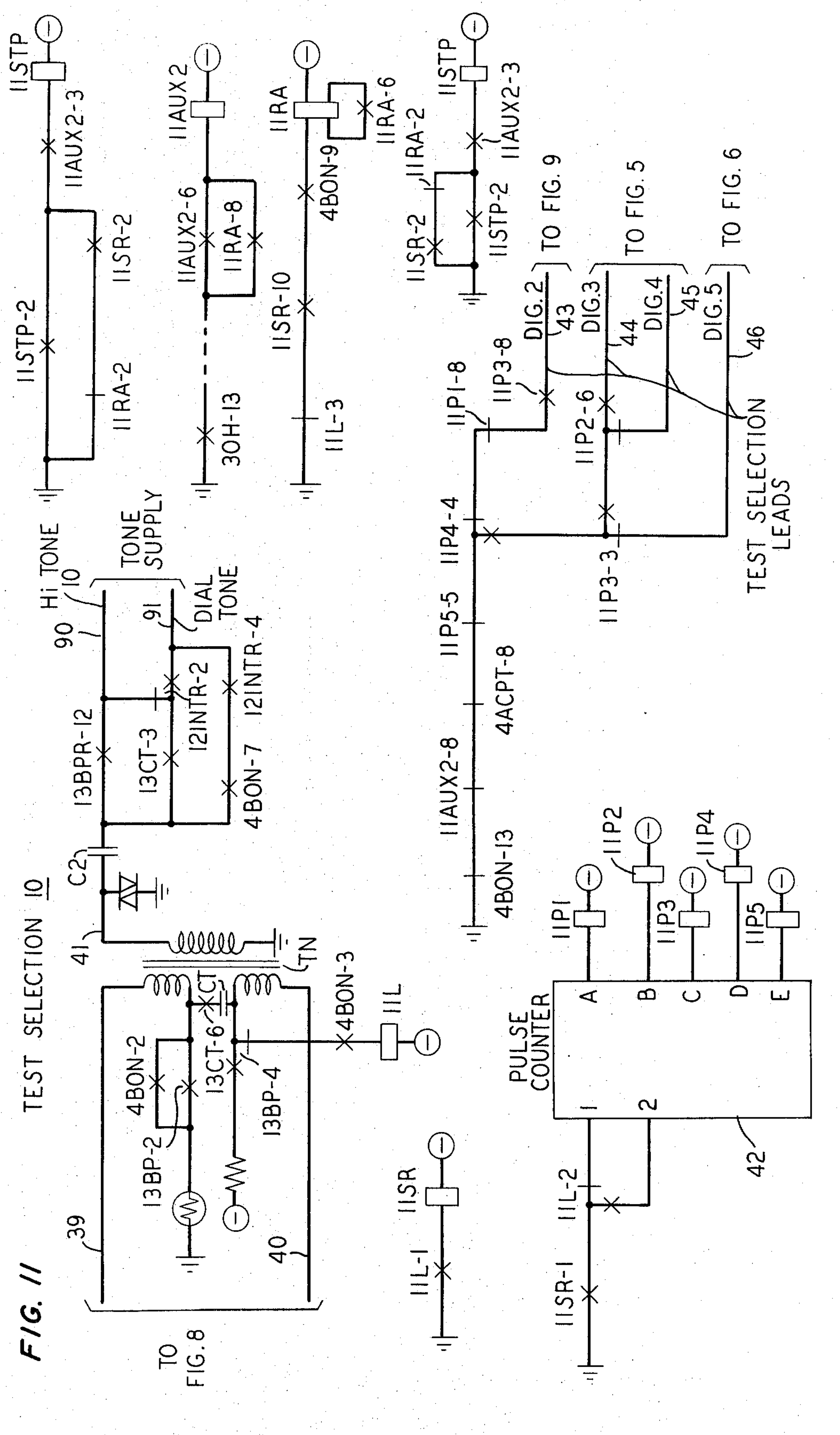
FIG. 11 shows the dial-a-test control circuitry.

The dialed digits are detected and recorded by the circuitry described in FIG. 11. The test line which threads through FIGS. 4A, 5 and 8 is a metallic path and no contacts shown in the path are operated at this time which would interfere with the coupling of each pulse to test selection circuit 10. Circuit 10 comprises customary pulse translation circuitry such as known in the dial pulse register circuits of switching systems. An example of a register circuit is disclosed in U. S. Pat. No. 2,585,909 to A. J. Busch on Feb. 19, 1952 in FIGS. 11, 12, 15, 16 and 23 thereof. In the subject arrangement pulses on the test line are detected by relay 11L. It is to be noted that relay 11L is connected via contacts 13BP–4 and 4BON–3 which are operated after the coin present and ground isolation tests are completed. Relay 11L is similar to relay L shown in FIG. 16 of the Busch patent. Pulse counter 42 contains circuitry similar to the circuitry of Busch shown connected to relay L. For a detailed description of the operation of this pulse detection circuitry reference may be made to column 62, line 15 et seq. of the Busch patent.

Depending on the digit dialed, digits 2-5, by the craftsman, one of the leads 43–46 shown at the lower right-hand side of FIG. 11, is grounded to activate a particular test. Since digits 1, 6, 7, 8 and 9 are unused in this embodiment, the necessity for detecting the presence of these digits and for returning an indication to the craftsman appears warranted. As such detection circuitry is obvious in view of what is already disclosed in FIG. 11 and since such addition circuitry would tend to obscure my invention, it was not included herein.

Resistance and Leakage Tests — Dial 2

Figure 9:
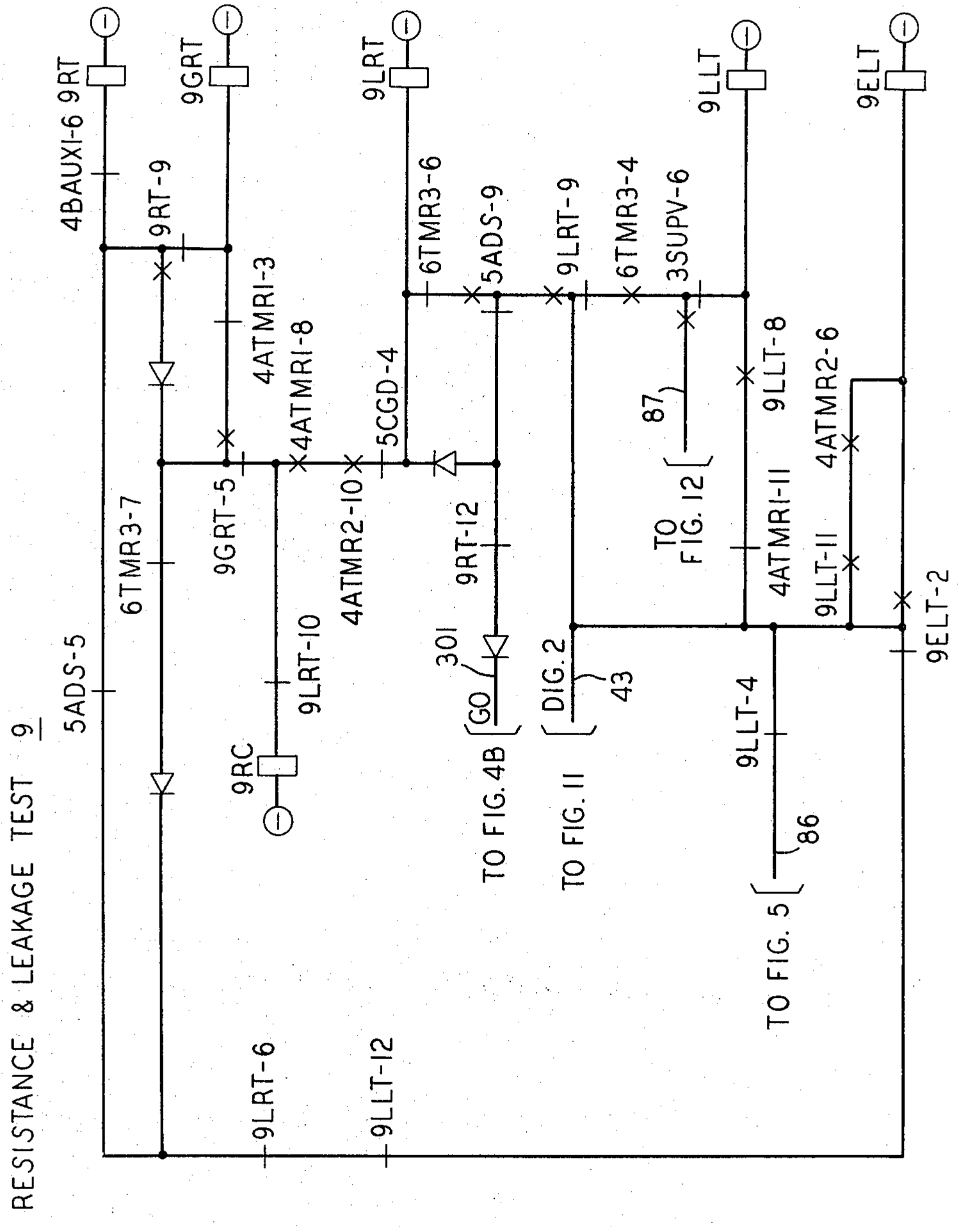
FIG. 9 describes control circuitry of the resistance and leakage test circuitry.
Figure 10:
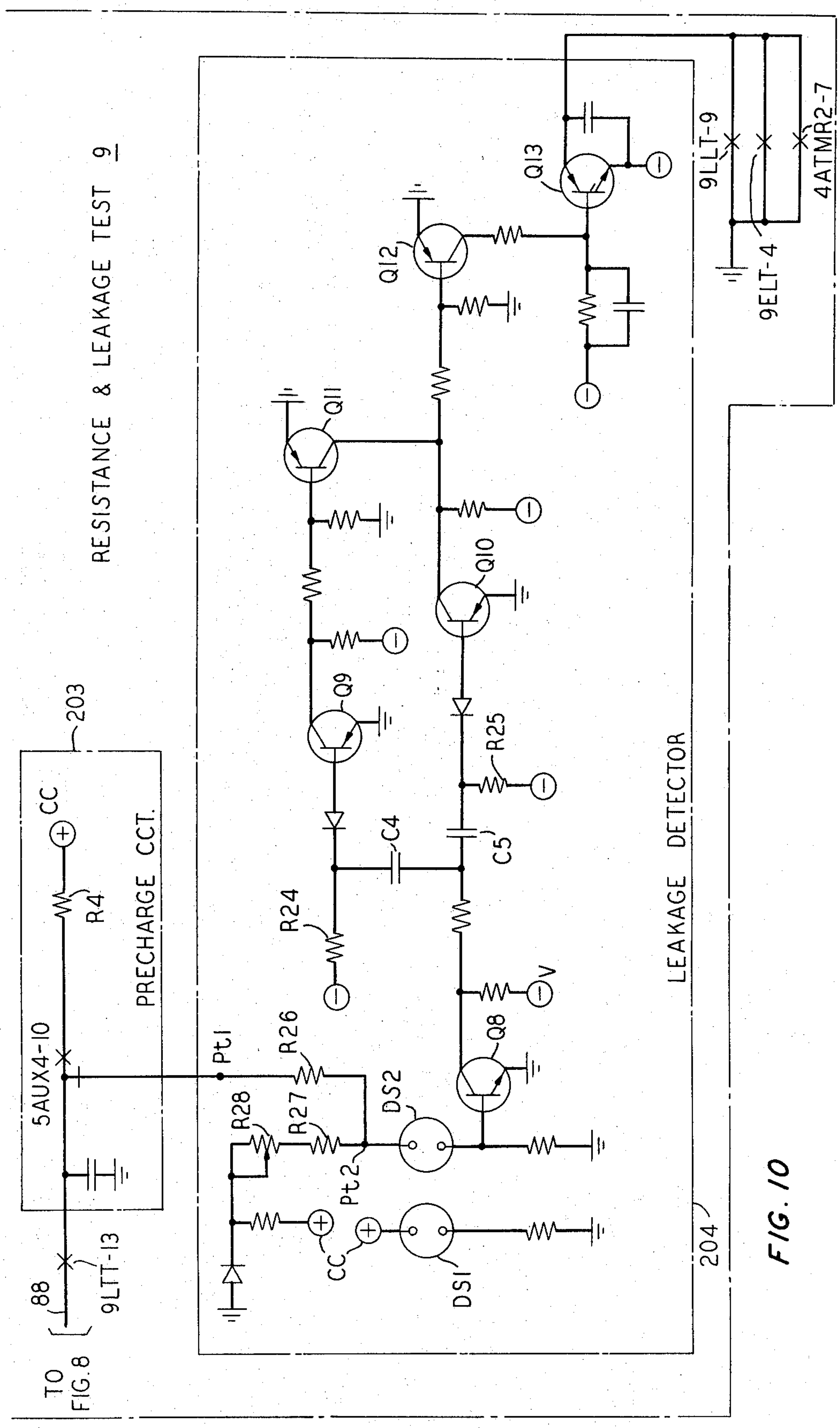
FIG. 10 shows a precharge and leakage detector circuit; of the resistance leakage test circuit.

The subcircuit of the test facility dedicated to the automatic performance of this test is shown in FIGS. 8, 9 and 10. FIG. 8 depicts the test line, conductors 49 and 50, which extends to FIG. 5 as well as a special current source 201. It will be recalled that source 201 was utilized during the ground isolation test to operate the coin ground removal relay at station 1. FIG. 8 further depicts a voltage detector which ascertains the combined resistance of the test line and coin station apparatus. FIG. 10 shows precharge circuit 203 which is momentarily connected to the tip lead of the test line to impress a known voltage thereon prior to the leakage test. The actual conductor leakage is determined by a novel arrangement which comprises detector 204. FIG. 9 contains the control circuitry of this test subcircuit and will be the starting place for the ensuing discussion.

Before a test begins, however, the coin present test is run again to insure that a coin ground is connected at station 1. Referring to FIG. 11, the first pulse of a digit designating the test, releases relay 11L, and at its contact 11L–3, provides a path to operate relay 11RA Relay 11RA has a secondary winding which is shorted by contact 11RA–6 to give it slow release characteristics. Thus, relay 11RA–6 operates during the first inter-pulse interval and remains operated for the train of pulses. In operating relay 11RA at its contact 11RA–8 closes a path to operate relay 11AUX2 which initiates the coin present test. It will be recalled that the operation of relay 4ACPT starts the coin present test. An operate path for this relay in FIG. 4A may be traced from its winding via contacts 4BON–12, 11STP–1 and 11AUX2–4 to ground. It is to be also noted that relay 11AUX–2 in FIG. 11 operates relay 11STP and releases relay 4BON (FIG. 4B). If a coin is not detected, C tone is sent to the coin station to request a coin deposit. Otherwise, the ground resistance test is immediately instituted by connecting ground to lead 43 which is also designated FIG. 2 in FIG. 11, via the pulse counter relays (11P1–11P5).

If the digit 2 is dialed and the coin present test is completed, a path from ground is closed in FIG. 11 to test selection lead FIG. 2, conductor 43, to operate relay 9GRT. This path may be traced from FIG. 11 to FIG. 9 over conductor 43, via contacts 9ELT–2, 9LLt–12, 9LRT–6, 5ADS–5 and 9RT-9 to the winding of 9GRT. Relay 9RT operates next via contact 4BAUX1–6 which connects to the path just described. Relay 4BAUX1 releases after the coin present test but is has slow release characteristics to prevent the operation of relay 9RT before 9GRT. Referring to FIG. 8, contacts on the latter relays connect current source 201 and detector 202 to the test line. Specifically, source 201 is connected by contact 9RT–11 to the tip lead, conductor 49, and detector 202 is connected via contact 9GRT–1 to the ring lead conductor 50. Importantly, contacts 9GRT–3 and 9RT–6 (shown as part of source 201) adjust the current output of source 201 so that the voltage measured by detector 202 will cause relay 8ANS1 to operate if the minimum allowable coin ground resistance is exceeded.

As soon as the loop conductor-to-ground resistance test begins timer TM1 (FIG. 4A) is started via contacts 9RT–1 and 5AUX4–8 and it times for two seconds as determined by contacts 9RT–3 and 5AUX4–9 which control the connection of shunting resistor R3 to timer TM1. At the end of this interval relay 4ATMR1 operates and relay 9GRT releases. If the resistance-to-ground exceeds a predetermined minimum value, detector 202 operates relay 8ANS1 which locks operated via contact 9GRT–4 as relay 9GRT releases.

Details of detector 202 circuitry have been omitted as this type of circuitry is considered to be well known in the art. One example of an arrangement which can function as detector 202 is a zener diode amplifier stage. The threshold voltage of the diode should be chosen for compatibility with the test voltage maximum.

After the ground resistance test, coin return potential is connected to the test line for releasing the coin deposited in station 1 thereby removing the coin ground. This action is preparatory to the next test, the loop resistance test. Relay 9RC (Return Coin) operates when relay 9GRT releases via contacts 9GRT-5 and 9RT-9 and the grounded path previously traced to the winding of relay 9RT. Turning to FIG. 5, relay 5RET (Return) is next operated via operated contact 9RC-10 for connecting a "return potential" to the tip and ring leads. The latter is shown at the top of FIG. 5 at contact 5RET–1 and 5RET–2. During this time, timer TM2 (FIG. 4A) is activated by operated contact 5AUX4–2. It is noted that relay 5AUX4 (FIG. 5) operates over an obvious path when relay 9RC operates and that timer TM2 (FIG. 4A) which timed the prior test stage is recycled when contact 5AUX4–8 opens the ground actuating path thereto.

At the end of the timed interval relay 4ATMR2 operates releasing relay 5RET to remove the return potential from the test line. Specifically, relay 5RET releases when contact 4ATMR2–4 removes battery from the relay winding. Relay 5CGD is next connected to the tip lead, conductor 49, to check for the removal of coin ground at station 1. Relay 5CGD is connected to battery via contact 6RC–1. If relay 5CGD is released after the interval measured by timer TM1, then relay 9LRT operates advancing the facility to the loop resistance test. Otherwise, the test facility will lock with relay 9RC operated and the circuit will automatically disconnect after a 60 second interval when relay 3DISC operates.

In operating, relay 9LRT shown at the right-hand side of FIG. 9 releases relay 9RC at contact 9LRT–10 and readjusts the current output of source 201 (FIG. 8). Also voltage detector 202 as well as current source 201 are coupled together via contacts 9RC-9 and 9LRT-2 and simultaneously connected via contact 9RT–11 to the tip lead. At this time ground via contacts 9LRT–12 and 9RT-8 is connected to the ring lead. Relay 9LRT at contact 9LRT–1 starts timer TM3 (FIG. 6) which measures a two second period after which relay 6TMR3 operates. Once again the current output of source 201 is adjusted so that detector 202 operates if the loop resistance is above a predetermined minimum value. The output of detector 202 is coupled via contact 9LRT-8 to relay 8ANS2 to record the test result. At the end of the timed interval relay 6TMR3 operates releasing relay 9RT and grounds conductor 301 (FIG. 9) which, in turn, operates relay 13RTN and 13BP to signal station 1. More specifically, with reference to FIG. 9, ground on conductor 43 (digit selection lead from FIG. 11) is coupled via contacts 9LRT–9, 5ADS–9 and 9RT–12 to conductor 301. The latter can be traced to FIG. 13, where relay 13RTN operates, followed by the operation of relay 13BP via contact 13RTn–8.

One of the following signals is sent to coin station 1 to indicate the test results. They are as follows:

a. 1 beep tone — bad ground
b. 2 beep tones — bad loop
c. 3 beep tones — loop and ground OK.

The first signal is generated if relay 8ANS1 only is operated. The second signal, is controlled by relay 8ANS2, while the 3 beep tone signal occurs if neither of the relays is operated. The application of these tones to the test line in response to the condition of relays 8ANS1 and 8ANS2 is controlled by the circuitry of FIGS. 12 and 13. Details of the operation of this circuitry is disclosed herein under the heading, "Status Indicator."

After transmission of the test results, a steady high tone is sent to the coin station requesting that the station receiver be placed on-hook. When the receiver is on-hook, a conductor leakage measurement is made over the test line. If the receiver is not placed on-hook within 60 seconds, the test line is automatically disconnected. The leakage test is designed for early detection of leaky loops which will inevitably cause circuit failures unless taken out of service. The standard employed is that leakage resistance values less than 100,000 ohms indicate a leakage breakdown of the cable conductors warranting a warning indication.

The leakage value of conductors measured either between leads of a transmission pair or from any lead of a cable to ground (earth potential) is determined by the novel arrangement shown in FIG. 10. Detector 204 employs a neon gas tube sensor DS2 which is maintained partially ionized by neon lamp DS1 situated close to neon DS2 to improve its operating characteristics. The lead to be measured is connected to point Pt1 so that a voltage divider is formed including the effective leakage resistance to be measured in series with resistors R26, R27 and R28 to ground. This assumes that the leakage test is measured with respect to ground which is the most common test. If the voltage at point Pt2 falls below the sustaining voltage of neon DS2 because of a low leakage resistance value, transistor Q8 turns off causing latching transistor Q13 to turn on via the circuitry of associated transistors Q9 – Q12.

In my arrangement the line capacitance serves in a unique way. Prior to connecting point Pt1 to a conductor for measurement, "coin return" potential is connected to the loop to charge the line conductors. A charge equivalent to the applied voltage is stored by the line capacitance. After the charging potential is removed, the charged line is connected to point Pt1 and to neon DS2. The voltage decay on the line is a function of the line capacitance as well as the leakage resistance. Accordingly, the leakage test verifies both of these cable characteristics in a single test.

Turning now to specific circuit details and to FIG. 5, the operation of relay 5ADS (Add Supervision) shown at the bottom of that figure activates circuitry for verifying that the station receiver is on-hook before making leakage tests. Contacts of this relay reactivate timer TM3 (FIG. 6) at contact 5ADS–6, and connect relay 3SUPV (FIG. 3) to the tip and ring leads via contacts 5ADS–1 and 5ADS–2. When timer TM3 times out and relay 6TMR3 operates, a steady high tone is sent to coin station 1 if relay 3SUPY is still operated. This indicates that the station receiver is still off-hook. Otherwise, relay 9LLT operates via contacts 3SUPY–6, 6TMR3–4 and 9LRT–9 which connect to the digit selection ground on lead 43. Relay 9LLT releases relay 5ADS at contact 9LLT-4 which is shown in FIG. 9 removing ground from lead 86.

The line is precharged as shown in FIG. 10 by connecting a positive voltage, CC, of precharge circuit 203 to the tip lead, conductor 39 (FIG. B). Relay 5AUX4 (FIG. 5) operates for a short duration under control of a pulse from precharge control circuit 205 when contact 9LLT–1 connects capacitor C6 to the winding of relay 5AUX4. Referring again to FIG. 10 contact 5AUX4–10 connects voltage CC via resistor R4, contact 9LLT–13, conductor 88 and contact 4ATMR2–1 to the tip lead, conductor 39. When relay 5AUX4 releases contact 5AUX4–10 opens and the charging voltage is replaced by a connection to point Pt1 of detector 204. IF the loop conductor is leaky, transistor Q13 of detector 204 operates and latches via contact 9LLT–9.

During the leakage test timer TM2 (FIG. 4A) is enabled by operated contact 9LLT–5. At the end of the timed interval relay 4ATMR2 operates to transfer the leakage test from the tip lead to the ring lead. The tip lead is also connected to ground to allow for detection of either a ground on the tip or ring leads as well as a short therebetween. Specifically and with reference to FIG. 8, contacts 4ATMR2–1 and 9LLT–7 ground the tip lead while contact 4ATMR2–2 and lead 88 connects point Pt1 of detector 204 to the ring lead. Relay 5AUX4 (FIG. 5) is reoperated once again for a short duration by contact 4ATMR2–3 of precharge control circuit 205 to charge the tip lead before the second leakage test is made. Again a leaky cable is indicated by a failure to provide the sustaining voltage of neon DS2, and thus transistor Q13 is operated and latched, if not latched on the first leakage test.

During the second leakage test, timer TM1 (FIG. 4A) was again enabled by contact 4ATMR2–6 to time the operation. At the end of this timed interval, relay 4ATMR1 operates to release relay 9LLT at contact 4ATMR1–11 as shown in FIG. 9. It is to be noted that relay 9ELT operates next to furnish a holding path at contact 9ELT–4 (FIG. 10) in the event transistor Q13 is latched.

Relay 13BP is enabled by relay 9ELT to control a signal which is sent to the coin station to report the test results. Since the station receiver is presently on-hook, the reply is a ringing signal as follows;

a. 1 ring —line OK b. 2 rings —line leaky.

After the answer has been forwarded, relay 4BON in FIG. 4B is operated to remove at its contact 4ON–13 in (FIG. 11) ground from the digit selection lead, conductor 43. In turn relay 9ELT is released preparing the test facility for the next dialed test selection.

Coin Collect Test — Dial 3

The receipt of the digit 3 by test selection 10 (FIG. 11) initiates the test of the coin station collect apparatus. The test facility subcircuit particularly involved in performing coin collect as well as coin return tests is shown largely in FIG. 5. Before a coin collect test is actually implemented, the coin present test is run to verify that a coin has been deposited in coin station 1. It will be recalled that during the first interpulse interval of the dialed digit, relay 11RA operates causing in turn relays 11AUX2 and 4ACPT to operate. The latter initiates the coin present test. It is to be noted that a coin present test is run before every dial selected test. For more specific details as to the activation of the coin present test under these conditions, reference may be made to the heading "Resistance and Leakage Test" above.

Assuming that a coin ground is present at the coin station, relay 4ACPT releases at the end of the coin present test. Referring now to FIG. 11, the digit 3 is detected by pulse counter 42 and relays 11P2, 11P3, and 11P4 are operated. Accordingly, upon the release of relay 4ACPT, ground is applied to test selection lead 44 as shown in the right-hand side of the figure.

Figure 3:
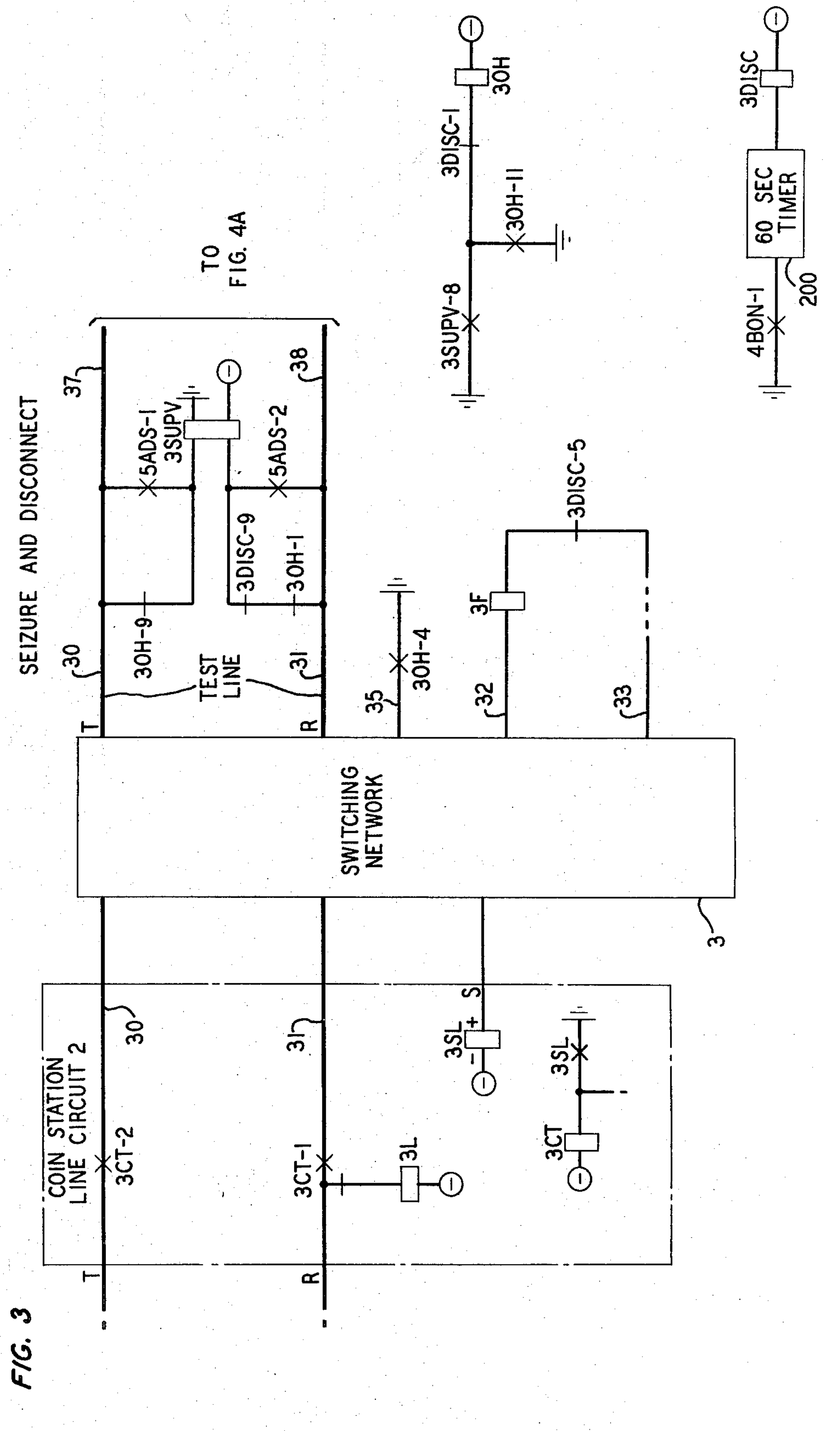
FIG. 3 shows a coin station line circuit and the seizure and disconnect circuit of the test facility.

The coin collect test is implemented while the station receiver is on-hook. Accordingly, a signal must be transmitted to the craftsman requesting that the receiver at coin station 1 be placed on-hook. Relay 5ADS which operates from ground on test selection lead 44 controls a test of the transmission path connected to coin station 1 to determine the present status of the receiver. The results of this test will determine whether an instructional tone should be sent to the craftsman or the collect test should be immediately implemented. Specifically, a path for operating relay 5ADS may be traced beginning at its winding via contacts 4TMR1–6, 5TC–6, 5TST–8 and diode D3 which connects to ground on test selection lead 44. Operated contacts 6ADS–1 and 6ADS–2 as shown in FIG. 3 connect relay 3SUPV to the tip and ring leads, conductors 30 and 31. Operation of relay 3SUPV indicates that the receiver is off-hook and therefore a high tone must be sent to the coin station. The application of this signal is controlled by relays 13RHU and 13CT (FIG. 13). The manner in which the tone signals are forwarded to the coin station as a result of the operation of these relays is discussed in detail under the heading "Status Indication". A path for operating these relays may be traced from their windings which are connected to conductor 47 and via contacts 3SUPV–4 and 5ADS–3 to ground on test selection lead 44. As soon as the craftsman places the receiver on-hook, relay 3SUPV releases and the collect test is begun. Also, relays 13CT and 13RHU are released removing high tone from the test line.

Relay 5COL shown at the center of FIG. 5 operates from the test selection conductor 44 when relay 3SUPV is released. Operated contacts of relay 5COL connect a "collect potential" as shown at the top of the same figure to the tip and ring conductors. At the same time a 200 millisecond (ms) interval is measured at the termination of which relay 5COL is released. Thus, the collect potential is a 200 ms positive voltage signal simultaneously applied to the tip and ring conductors. More specifically, the path for operating relay 5COL may be traced from battery via contact 4ATMR2–4, the winding of relay 5COL and contacts 3SUPV–12, 4AUX1–7 and 5TC–11 which connect to ground on test selection conductor 44. The 200 ms interval is timed by timer TM2 shown in FIG. 4A. Timer TM2 is enabled by relay 5AUX4 shown just above the winding of relay 5COL. The latter also operates over an obvious path which connects to ground on test selection lead 44. Referring again to timer TM2, it is enabled by ground which is connected by contact 5AUX4–2. At the end of the interval relay 4ATMR2 operates and removes battery from the winding of relay 5COL thereby releasing it. This in turn removes collect potential from the tip and ring leads.

Before a test is made to ascertain whether coin ground was removed in response to the application of a collect potential to leads T and R, timer TM1 is enabled to delay the operation of the test giving the station equipment time to drop the coin. A path for activating timer TM1 may be traced from ground via contacts 6CG–1, 4BAUX1–10 and 4ATMR2–6. At the end of the timed interval relay 4ATMR1 operates to begin a test for the presence of coin ground. Referring now to the lower left-hand side of FIG. 5, relay 5TST operates via contact 5ATMR1–7 which connects the winding of the relay to ground on test selection conductor 44. In turn, this controls the connection of a ground sensing relay, 5CGD, shown at the top of FIG. 5 to the tip lead. The latter is connected via operated contact 5TST–1 to positive battery. If ground is present at the coin station, relay 5CGD operates and relay 5TST is released. Advantageously, my arrangement is designed to recycle this test so that collect potential is again applied to the tip and ring conductors in a second and third attempt to drop the coin. These attempts will cease automatically upon the operation of relay 5CGD.

At the time relay 5TST is operated, relay 4BAUX1 is also operated to disable timer TM1 and release relay 4ATMR1 which removes the operating path for relay 5TST. Accordingly, relay 5TST is held operated via contact 5CGD-2 and it therefore releases if ground is detected. Each attempt to collect a coin is registered on relays 5ATA, 5ATB and 5ATC shown to the lower right-hand side of FIG. 5. Terminal 1 of pulse counter 51 shown in FIG. 5 is pulsed each time relay 5COL operates via its contact 5COL–3. In turn, counter 51 controls the operation of the attempt register relays 5ATA–5ATC. Relay 4BAUX1 releases when relay 4ATMR1 releases restoring a path between test selection lead 44 and the windings of relays 5COL and 5AUX4 to reapply the coil return potential and to time again the 200 ms interval.

A successful attempt to return a coin results in the operation of relay 5TC. The latter relay also operates after a third attempt which is indicated by the operation of relay 5ATC. Relay 5TC ends the test and controls the application of an answer signal to the coin station. In particular the 5TC relay operates relay 13RHU which causes the transmission of one of four ringing signals, repeated three times, indicating the state of the attempt counter. The signal are as follows;

| Coin Returned | Answer |
|---|---|
| First Attempt | 1 Ring |
| Second Attempt | 2 Rings |
| Third Attempt or Not Returned | 3 Rings |

Upon the completion of transmission of the answer to the coin station, the test selection ground is removed by resetting pulse registration relays 11P2–11P4. The registration relays release when relay 4BON operates under control of the status indicator circuit 11. In particular with reference to FIG. 4B a path for operating relay 4BON may be traced from its winding via contacts 11AUX2–7, 5TC–1, 13RTN–2 and 13BP–1 to ground. Relay 5TC releases when ground is removed from test selection conductor 44.

Coin Return Test — Dial 4

This test is initiated when the digit 4 is dialed and recorded by test selection circuit 10. With the exception of relay 5RET which operates in place of 5COL, this test functions substantially in the same manner as the collect test hereinbefore described. Relays 11P3 and 11P4 are operated by pulse counter 42 as shown in FIG. 11 to ground test selection lead 45 in response to the digit 4. Conductor 45 may be traced to FIG. 5 wherein it operates relay 5RET which applies a negative return "potential" concurrently to the tip and ring leads. As described in the coin collect test, the operation of relay 5CGD indicates that the station apparatus has not properly responded to the applied potential. As in the collect test, three attempts are made to drop the coin in the coin station. Also the signals returned to the station are identical with those described for the coin collect test.

Coin Relay Time Test — Dial 5

Figure 7:
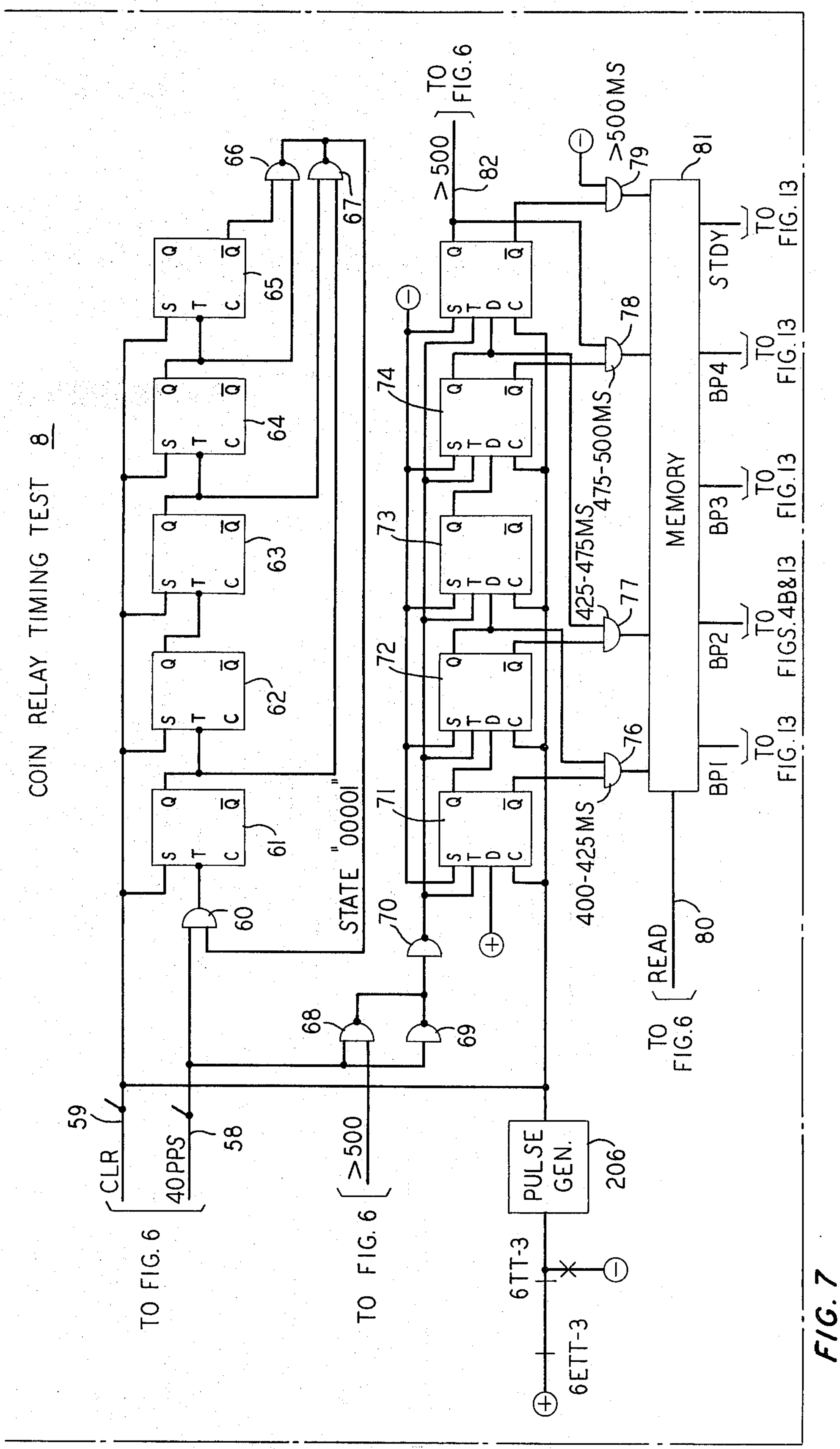

The subcircuit of the test facility for automatically performing the coin relay timing test is shown in FIGS. 6 and 7. FIG. 6 discloses the circuitry which responds to signals from test selection circuit 10 to start the timing arrangement disclosed in FIG. 7, to apply return potential to the transmission path and for timing the overall circuit operation. The timing arrangement of FIG. 7 comprises cascaded stages of toggle type flip-flops and memory 81 in which the states of the flip-flops are recorded at the end of each test.

The coin relay time test assists the craftsman in approximating the operating time of the coin relay, 2CR, in the coin station apparatus. For optimum operation of this apparatus, the coin relay operate time should be 450 ms ± 25 ms. In the same fashion as described before for other dial-selected tests, the subcircuit first checks to determine if a coin is present in the coin station. If a coin is not present, a C tone is sent requesting that a coin be deposited. If the craftsman fails to deposit a coin within 60 seconds, the coin station will be automatically disconnected from the test facility. Once a coin is detected the apparatus will automatically transmit a return potential and simultaneously therewith, time the interval until a coin ground is removed. Following this an indication of the operate time as it falls within predetermined ranges is sent over the test leads in coded tones repeated three times to indicate what action must be taken. This test can be repeated continuously without dialing the digit 5 by depositing coins so as to assist the craftsman in making a dynamic adjustment in the relay operate time when it is required. If the relay is within adjustment and the craftsman flashes the switchhook the test facility is now receptive for another dial selected test.

Considering now in greater detail the coin relay time test, upon satisfaction of the coin present test (indicated by the release of relay 4ACPT) a ground will be connected to test selection lead 46. This operates relay 6TT which is shown in FIG. 6. Operated contacts of relay 6TT prepare the timing circuit arrangement of FIG. 7 by generating a 200 ms coin return signal. This is initiated via relay 6CR which is operated by contact of relay 6TT (6TT–8). When relay 5RET operates, as will be discussed subsequently, control flip-flop 207 is set. When the latter is set gate 53 is enabled which extends the output of clock 52 to gate 55 which then drives flip-flops 56 and 57 which are connected in series and which in turn connect to the timing arrangement of FIG. 7.

Relay 6CR initiates the coin return attempt by operating relay 5RET which it will be recalled controls the application of return potential to the test line. Specifically, with reference to FIG. 5, relay 5RET is operated by contact 6CR–4 which extends ground to the winding of the relay. As shown at the top of FIG. 5, operated contacts 5RET–1 and 5RET–2 apply return potential to the test line. At the same time that the return potential is connected to the test line, timer TM2 shown in FIG. 4A is activated to limit the pulse applied to the test line to 200 ms. Relay 5AUX4 also operates from the ground which extends to the winding of relay 5RET. Operated contact 5AUX4–2 connects the enabling ground to timer TM2. At the end of the timed interval relay 4ATMR2 operates and relay 5RET is released thereby removing the return potential from the test leads. In addition, operated contact 4ATMR2–8 connects the ground detection relay 5CGD to the tip lead. The latter will ordinarily operate immediately because of the presence of coin ground due to the slow response of the coin station apparatus to the application of the return potential.

With reference to FIG. 7 the timing circuit shown therein is activated to measure the interval between the application of return potential to the test conductors and the removal of coin ground at the coin station. The timer is activated via gate 53 of FIG. 6 which couples the output of clock 52 as previously described to conductor 58. The clock output which is 120 pulses per second (pps) is divided by flip-flops 56 and 57 producing an output of 40 pps on lead 58. The 40 pps clock has a period of 25 ms. Flip-flops 61 through 65 operate until the state "00001" is reached at which time gate 60 is turned off. This state corresponds to the arrival of the seventeenth pulse generated by clock 52 and occurs 400 ms after the initial pulse is received. Subsequent pulses are received and measured via gates 68, 69 and 70. Flip-flops 71 through 75 constitute a five bit serial shift register. As the 25 ms interval pulses occur, the registers will shift through 6 distinct states until the final state of the counter at 500 ms which is "11111." As shown in FIG. 7 gate 76 is enabled if the interval measured is between 400 and 425 ms; gate 77 is enabled if the interval measured is between 425 and 475 ms; gate 78 is enabled if the interval measured is between 475 and 500 ms; and gate 79 is enabled if the interval measured is greater than 500 ms. If the interval is less than 400 ms gates 76 through 79 are not enabled.

The stream of pulses which control the timing arrangement of FIG. 7 are cut off so as to determined the end of the measured interval upon the release of relay 5CGD. With reference now to FIG. 6, as shown at the bottom thereof, when relay 5CGD initially operated, relay 6CG was operated via a zener diode, diode D5. Diode D5 established a 6 volt potential across capacitor C8 which charges to that potential. When relay 5CGD releases, contact 5CGD–1 transfers the charged potential on capacitor C8 via contact 6TMR3 to control flip-flop 207 which is cleared. Accordingly, gate 53 is turned off and the pulses from clock 52 are no longer coupled to the timing arrangement of FIG. 7. Assuming it takes greater than 500 ms for the coin ground to be removed at the coin station, the timing arrangement of FIG. 7 applies a clear pulse to control flip-flop 207 via lead >500.

If relay 5CGD was released in less than 300 ms. after the application of the return potential, relay 6TMR3 will not be operated and thus the clear pulse which is generated by capacitor C8 is not coupled to control flip-flop 207. Relay 6TMR3 operates at the end of a timed interval measured by timer TM3. The latter is enabled when the coin relay potential is removed from the tip and ring by the operation of contact 4ATMR2–9 which connects ground to timer TM3.

When control flip-flop 207 is cleared, a pulse is generated at its terminal Q which operates gate 208 for sending a read pulse via cable 80 to memory 81 shown in FIG. 7. The output of memory 81 is coupled via leads BP1–BP4 and STDY to the status indicator circuit 11 shown in FIG. 13. As will be described under the heading entitled "Status Indication," tone signals are transmitted to the craftsman at the coin station in accordance with the state of the timing circuit arrangement and the data stored in memory 81. In addition to the foregoing, the read pulse enables latching transistor Q12 and in turn causes relay 6ETT to operate. In operating, contacts of relay 6ETT release relays 6TT, 6CR and 5AUX4 which restores the coin relay timing test to normal. Also, relay 6ETT forwards a signal to FIG. 13 and this signal operates relay 13BP to control the answer transmitted to the coin station.

When the tone has been transmitted to the coin station, relay 4ACPT is automatically operated via a contact of operated relay 6ETT to initiate once again a coin present test. At the same time the operation of relay 4ACPT removes ground from the test selection leads so as to prevent a new test until a coin is deposited at the coin station. If a coin is deposited, coin ground will be detected and relay 4ACPT will release thereby beginning the coin timing test cycle once again by closing a path to operated relay 6TT. The time test will continue to repeat until the switchhook is flashed during the time the circuit is awaiting the deposit of a coin. In the last event if the switchhook is flashed for one second relay 4BON is operated and the circuit readies itself for a new test selection by dialing another digit.

Figure 12:
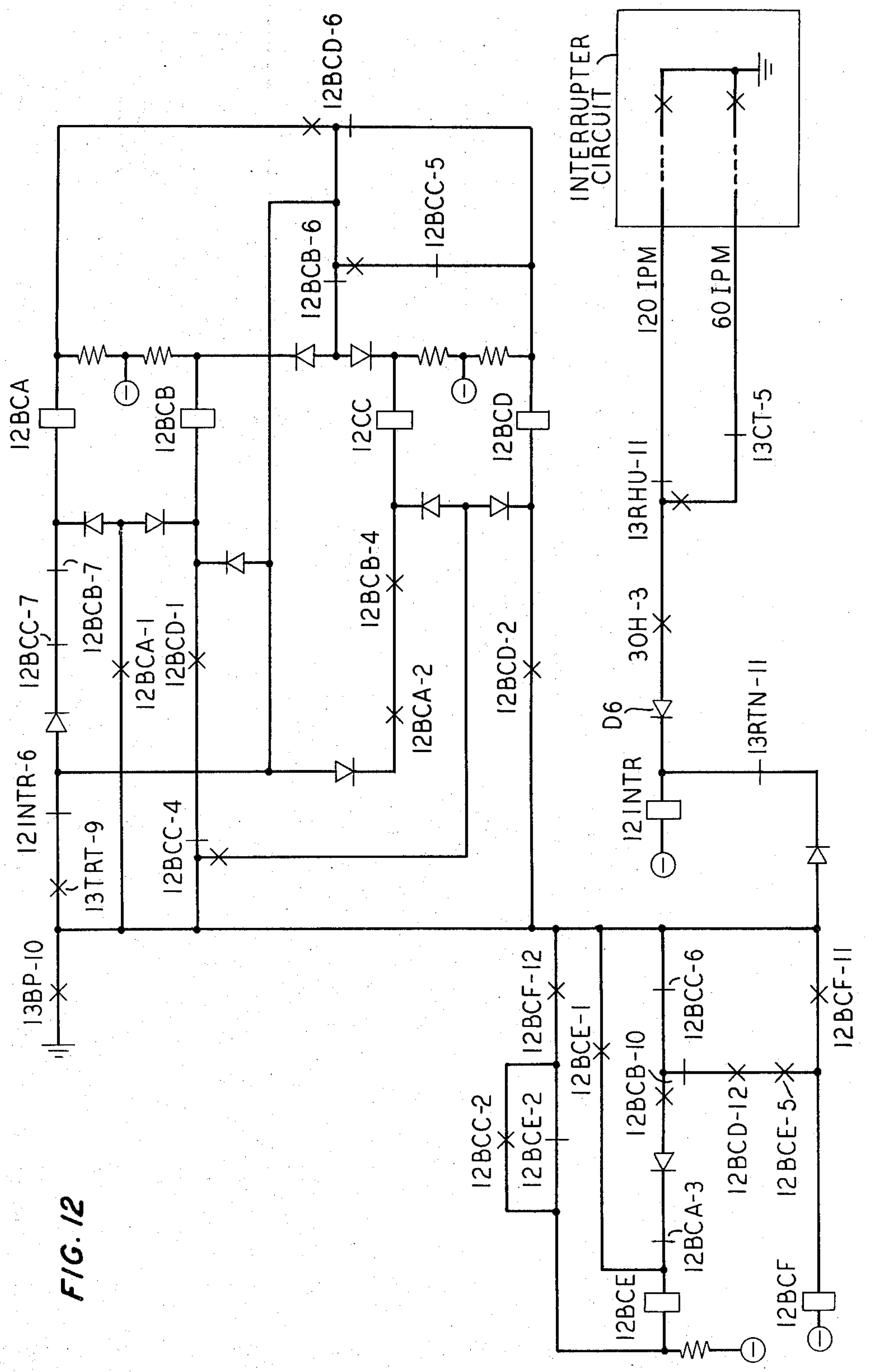
FIGS. 12 and 13 disclose the test status indicator circuitry.
Figure 13:
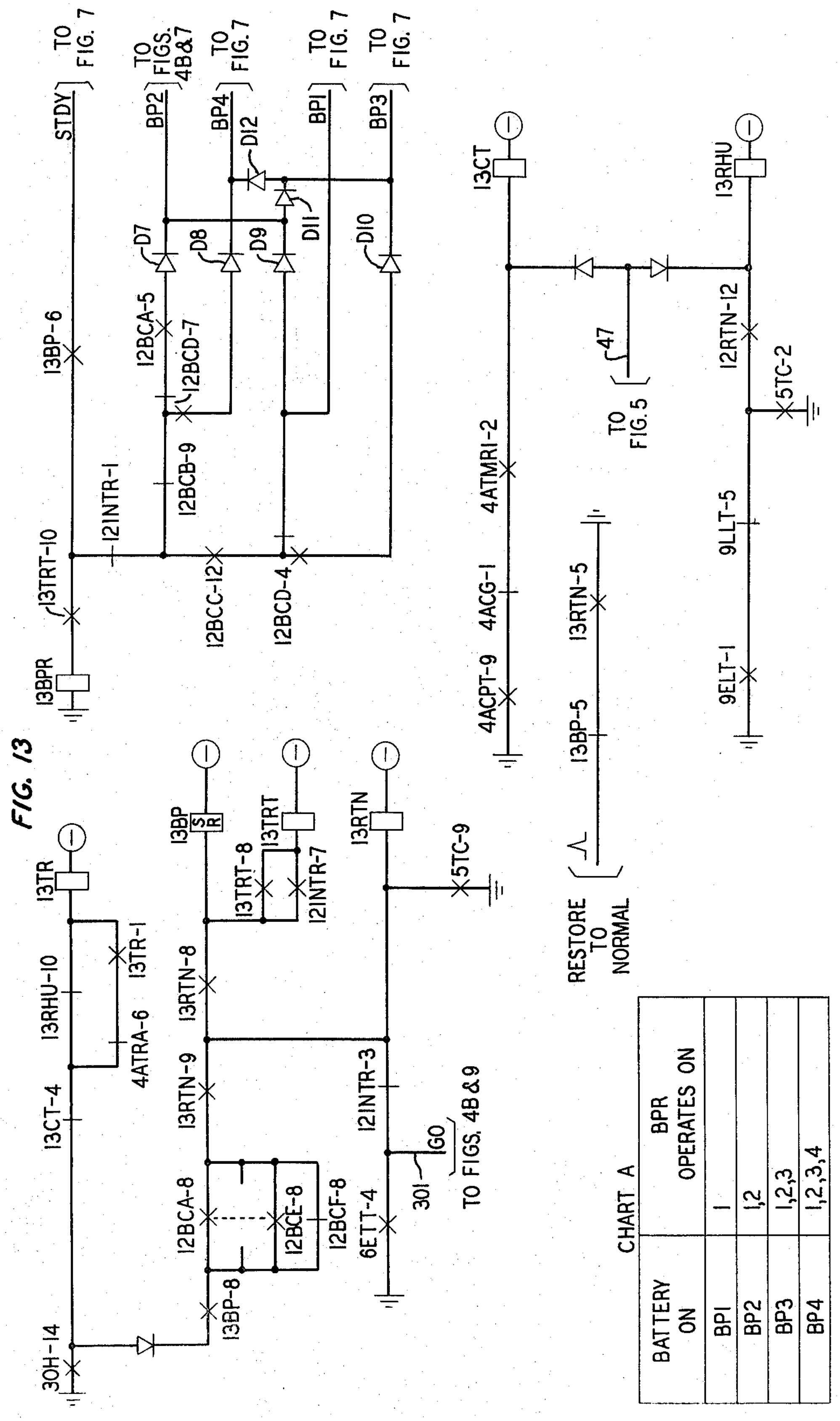

Status Indication (FIGS. 12 and 13)

FIGS. 12 and 13 depict the subcircuitry of the test facility for returning tone as well as ringing signal indications to a coin station for indicating the state of the facility or the results of performed tests. It is capable of transmitting the following signals:

- (a) C (Coin) tone
- (b) Interrupted dial tone
- (c) Hangup tone
- (d) Coded ringing signals
- (e) Coded beep tones In general, C tone is provided whenever a coin is desired to start a test and no coin is detected in the station apparatus. This tone is generated when relay 13CT shown in FIG. 13 is operated. As shown in FIG. 11, operated contacts of relay 13CT connect the primary coils of transformer TN to complete an audio signaling path and connect tone to the secondary coil of transformer TN. Relay 12INTR is connected to the output of an interrupter circuit as shown in FIG. 12 when the facility is initially seized. The periodically operated contacts of that relay, contact 12INTR-2 which is shown in FIG. 11, connects alternately hi tone and dial tone to the secondary coil of transformer TN. Specifically, and referring once again to FIG. 12, a path for connecting relay 12INTR to the interrupter circuit may be traced from its winding via diode D6, contacts 3OH–8 and 13RHU–11 which connects to the lead designated 12OIPM. The latter lead designation indicates the interruption rate of the ground pulses which are connected to relay 12INTR. Thus, the C tone consists of alternate application of hi tone and dial tone. C tone is removed upon the release of relay 13CT.

Interrupted dial tone is supplied over the test line when the facility is prepared to receive a test selection digit. The tone transmission is initiated when relay 4BON operates. As shown in FIG. 11, operated contact 4BON-7 connects interrupted dial tone to the secondary winding of transformer TN. This path may be traced from the winding of transformer TN via lead 41, capacitor C2, contact 4BON-7 and periodically operated contact 12 INTR–4 which connects to dial tone. Interrupted dial tone is used in place of steady dial tone to differentiate it from the dial tone signal transmitted by the office dial pulse registers.

Hangup tone is a steady hi tone which is sent over the test line whenever the station received is to be placed on-hook preparatory to the running of a test sequence. This tone signal is produced by simultaneously operating relays 13CT and 13RHU. As described previously, relay 13CT prepares the primary and secondary windings of transformer TN (FIG. 11) for the transmission of the steady hi tone. In particular, this consists of connecting the primary windings together via capacitor CT. Relay 13RHU prevents the operation of relay 12 INTR by opening the path connecting the winding of that relay to the interrupter circuit as shown in FIG. 12. Accordingly, as shown in FIG. 11, hi tone which is connected to conductor 90 is sent over the test line through contacts 12 INTR–2 and 13CT–3.

So long as relay 13CT is operated it prevents the inadvertent transmission of ringing signals over the test line. With reference to FIG. 4A, ringing current is connected to the tip and ring conductors upon the operation of relay 13RHU as well as relay 13TR. However, relay 13TR is prevented from operating, or if operated is released, if relay 13CT is operated. As shown in the upper right-hand corner of FIG. 13, operated contact 13CT 4 interrupts the operating path to ground for relay 13TR.

Test Answer By Coded Tone

Test answers are initiated by the operation of relay 13BP. This relay is operated by ground from any of the test subcircuits at the time it is desired to transmit an answer to the craftsman. A ground from such subcircuits is coupled to the winding of relay 13BP during the time relay 12INTR is released. The reason for this path will become apparent from a subsequent discussion of the signal counter arrangement. To insure the proper sequencing or starting point, the energizing ground initially operates relay 13RTN which in turn extends the energizing ground to the winding of relay 13BP. Specifically, with reference to FIG. 13, energizing ground is connected to lead 301 and a path for operating relay 13RTN may be traced via contact 12INTR–3. Operated contact 13RTN–8 extends the energizing ground to the winding of relay 13BP. When the latter relay operates, it locks operated via contact 13BP-8 and importantly, the parallel contacts, 12BCA–8 through 12BCF–8, of the counter arrangement. The operation of the counter is further delayed by the operate time of relay 13TRT which operates from the holding ground which is extended through operated contact 12INTR–7. This additional delay is necessary to insure that the totalizer equipment in the coin station is properly reset.

If the 13RHU relay is not operated when the energizing ground appears on lead 301, the answer will be sent to the craftsman as coded tone signals on the test line. If on the other hand the 13RHU relay is operated, ringing signals are set to the craftsman in place of coded tones.

The beep counter consists of the circuitry shown in FIG. 12. The counter is energized by contacts 13BP–10 and 13TR-9 shown at the top of the drawing. This operating ground is pulsed by contact 12INTR-6. During the first interpulse interval relay 12BCA operates, assuming the remaining counter relays are released. Upon receipt of the next pulse, relay 12BCB operates. During the next interpulse interval, relay 12BCC operates. Upon the receipt of the third pulse relay 12BCD operates leaving four relays operated at the end of that pulse. During the next interpulse interval relay 12BCA releases. Upon receipt of the fourth pulse relay 12BCB will release and on the succeeding interpulse interval relay 12BCC releases. Thus, prior to the receipt of the fifth pulse only relay 12BCD is operated. Upon the receipt of the fifth pulse relay 12BCE operates as well as 12BCB. Relay 12BCF operates at the ninth pulse interval. A complete cycle of the relay states occurs at the end of the sixteenth pulse.

During the counting interval the various operate and release states of the 12BCA – 12BCD relays are used to enable relay 13BPR via contact 12INTR–1. Depending on the number of beeps which are to be transmitted three times to the test station, the leads designated BP1 – BP4 are enabled. For example, if it is desired to transmit four beep tones repeated three times, battery is applied to lead BP4. Chart A shown on FIG. 13 shows the relationship between the number of operations of relay 13BPR per cycle of the counter versus a signal applied on leads BP1 – BP4. It is noted that diodes D7 – D12 create in effect OR gates which fundamentally control the number of beeps generated in each time period. The operate path for relay 13BP is removed when relays 12BCF and 12INTR are simultaneously operated to cease transmission of a coded tone. Specifically, the release is effected by operated contact 12BCD–8 which opens the holding circuit for relay 13BP and by operated contact 12INTR–3 which opens the energizing ground path. In turn relays 13TRT and 13RTN release, restoring the counting circuit to normal. Relay 13BP is slow to release and thus a pulse is created having a period equal to the difference between the release time of relays 13BP and 13RTN. This pulse causes the test facility to advance to the next state. More specifically, with reference to FIG. 13, contacts 13BP–5 and 13RTN–5 generate a pulse as shown in the figure which restores the circuit to normal. If it is necessary to generate a steady tone, the counter arrangement of FIG. 12 is allowed to count through an entire sequence as if a coded signal were being transmitted to the coin station. However, relay 13BPR is held operated via the lead designated STY shown at the top right-hand corner of FIG. 13. Thus, during an entire counting cycle a steady tone is applied to the line.

Test Answer by Coded Ringing

As stated previously, coded ringing is transmitted instead of coded tone when relay 12RHU is operated. Operated contacts of relay 12RHU disconnect the 120 ipm interrupted ground from the winding of relay 12INTR and connect instead a 60 ipm ground. Thus, the coding rate is slowed to allow time for the ringing codes to be recognized. In addition, the operated contacts of relay 12RHU cause the ringing signal to be periodically applied to the tip and ring leads via the 12BPR relays. Ringing supervision is provided by relay 4ATRA shown in FIG. 4A, the latter is added at the same time that the ringing signal is connected to the test line. Thus, if the test man removes the receiver during the transmission of coded ringing signals, relay 4ATRA operates and the test facility automatically switches to the transmission of coded tones. In the last instance, however, a 60 ipm rate instead of the customary 120 ipm rate is used as a fundamental signal clock. When relay 4ATRA operates, relay 13TR is released to prevent transmission of ringing signals when the receiver is off-hook.

what is claimed is:

1. In a telephone system having station lines subject to leakage to ground and conductor insulation breakdown, means for testing said lines comprising a precharging circuit and a neon tube detector circuit, means for connecting one of said lines with said testing means, means applying an output of said precharging circuit for a timed interval to said one line for charging said line to a predetermined voltage level, means in said detection circuit for establishing a current conduction state in said neon tube prior to utilizing of said detection circuit in a line test, means coupling said neon tube of said detector circuit to said charged line for making a leakage-insulation test thereof, excessive leakage being signified by the nonconductive state of said neon tube due to premature discharge of said line, and means responsive to the state of said tube for indicating the status condition of said one line.

2. The invention recited in claim 1 wherein said connecting means includes a test line extending from said testing means, means responsive to an address code dialed from said station for interconnecting said one line to said test line, and means responsive to a subsequently dialed digit for actuating said testing means to perform a leakage-insulation test on said one line.

3. The invention recited in claim 1 wherein said detection circuit includes means for timing the interval that said neon tube is connected to said charged line, and said timing means controls said indicating means which responds to the state of said tube.

4. The invention recited in claim 3 wherein said indicating means includes coded signal generating means controlled by the state of said tube for developing either one of two distinctive signals, and means connecting said generating means to said one line to report the status condition of said one line to said station.

5. In a telephone system, means in a switching office for testing the transmission paths extending from coin stations, means responsive to the receipt of an address code dialed from one of said stations for establishing a test line connection between said one station and said testing means, means responsive to the receipt of signals sent from said one station for selectively activating an automatic leakage-to-ground test by said testing means of said associated path via said test line connection, said testing means including a precharge circuit as well as a high impedance voltage detector circuit, means for applying an output of said precharge circuit to said test line connection to charge said path to a predetermined voltage level, and means connecting said detector circuit to said test line connection for measuring the voltage level on said conductors a prescribed interval after said line is charged for indicating the leakage condition thereon.

6. The invention recited in claim 5 further including means connected to said test line connection for sending instruction signals during the test to said station, and said sending means being controlled by said testing means at the start of a test to signal said station that the receiver should be placed on-hook preparatory to the leakage test.

7. The invention recited in claim 6 further including means for monitoring said test line connection for the switchhook status of said station receiver, and said applying means is controlled by said monitoring means to charge said path when an on-hook condition is detected.

8. The invention recited in claim 5 wherein said high impedance voltage detector circuit includes a neon tube circuit for detecting the voltage level on said charged line, and said excessive leakage condition being signified by the nonconductive state of said neon tube due to premature discharge of said path.

9. The invention recited in claim 8 wherein said detection circuit includes means for establishing a current condition state in said neon tube prior to connection of said tube to said test line connection, and said leakage condition is indicated when the voltage of said path is less than the threshold voltage of said tube.

10. The invention recited in claim 5 further including means connected to said detector circuit for controlling the transmission via said test line connection of a first signal indicating a trouble-free path and a second signal indicating a leakage condition.

11. The invention recited in claim 5 further including means activated by said applying means for timing the interval that said precharged circuit is connected to said test line connection, and means controlled by said timing means for disconnecting said precharged circuit from said test line connection at the end of said timed interval.

* * * * *

UNITED STATES PATENT OFFICE
CERTIFICATE OF CORRECTION

Patent No. 3,694,587 Dated September 26, 1972

Inventor(s) James A. Grandle, Jr.

It is certified that error appears in the above-identified patent and that said Letters Patent are hereby corrected as shown below:

Column 1, line 51, change "rest" to --test--.

Column 5, line 12, change "steeping" to --stepping--.

Column 10, line 4, after "6TMR3-2" delete "4ASHF-2" and insert --4ASHF-1, 4ATMR1-2,--.

Column 12, line 30, change "9LLt-12" to --9LLT-12--;
line 34, change "is" to --it--.

Column 13, line 55, change "13RTn-8" to --13RTN-8--.

Column 14, line 54, change "3SUPY" to --3SUPV--;
line 56, change "3SUPY-6" to --3SUPV-6--.

Column 15, line 2, change "9LLT-13" to --9LTT-13--.

Column 17, line 4, change "5ATMR1-7" to --4ATMR1-7--;
line 31, change "coil" to --coin--.

Column 21, line 23, change "received" to --receiver--.

Column 22, line 12, change "set" to --sent--;
line 51, change "12BCD-8" to --12BCF-8--.

Column 24, line 27, change "the" to --a--;
line 43, change "condition" to --conduction--.

Signed and sealed this 13th day of March 1973.

(SEAL)
Attest:

EDWARD M.FLETCHER,JR.
Attesting Officer

ROBERT GOTTSCHALK
Commissioner of Patents